(12) United States Patent
Haughton et al.

(10) Patent No.: US 9,732,681 B2
(45) Date of Patent: Aug. 15, 2017

(54) GENERATION OF ELECTRICITY FROM EXHAUST GAS

(71) Applicant: Controlled Power Technologies, Ltd., Essex (GB)

(72) Inventors: Andrew Haughton, Essex (GB); Andrew Dickinson, Essex (GB); Richard Quinn, Essex (GB); David Pearce, Essex (GB); Roshan Wijetunge, Essex (GB)

(73) Assignee: Controlled Power Technologies, Ltd., Essex (GB)

( * ) Notice: Subject to any disclaimer, the term of this patent is extended or adjusted under 35 U.S.C. 154(b) by 72 days.

(21) Appl. No.: 14/784,755

(22) PCT Filed: Apr. 23, 2014

(86) PCT No.: PCT/GB2014/051264
§ 371 (c)(1),
(2) Date: Oct. 15, 2015

(87) PCT Pub. No.: WO2014/174285
PCT Pub. Date: Oct. 30, 2014

(65) Prior Publication Data
US 2016/0084173 A1   Mar. 24, 2016

(30) Foreign Application Priority Data

Apr. 26, 2013 (GB) .................................. 1307610.4
Oct. 22, 2013 (GB) .................................. 1318644.0

(51) Int. Cl.
*F02B 37/00* (2006.01)
*F01N 3/20* (2006.01)
(Continued)

(52) U.S. Cl.
CPC ............... *F02D 29/06* (2013.01); *F01N 5/04* (2013.01); *F02B 41/10* (2013.01); *H02P 9/04* (2013.01);
(Continued)

(58) Field of Classification Search
CPC ...... F02B 37/013; F02B 37/183; F02B 37/18; F02B 37/004; F01D 21/003; F01D 21/006;
(Continued)

(56) References Cited

U.S. PATENT DOCUMENTS 7,174,714 B2 * 2/2007 Algrain ................... F02D 37/00
290/40 A
7,478,533 B2 * 1/2009 Ueno ..................... F02B 37/004
290/52

(Continued)

FOREIGN PATENT DOCUMENTS

EP   1848084   10/2007
EP   2053214   4/2009
(Continued)

OTHER PUBLICATIONS

International Search Report for PCT/GB2014/051264. Mailed Mar. 31, 2015.
(Continued)

*Primary Examiner* — Mark Laurenzi
*Assistant Examiner* — Dapinder Singh
(74) *Attorney, Agent, or Firm* — Stetina Brunda Garred & Brucker

(57) ABSTRACT

A turbo-generator system generates electricity from the exhaust gas of an internal combustion engine 1. The electric current generated by the generator 11 (e.g. a switched reluctance machine) is controlled so as to maintain the turbine 3 at a first pre-set rotational speed. The amount of
(Continued)

electric current demanded from the generator 11 is limited or reduced if the electrical system 17 cannot accept a greater electric current or if the exhaust gas pressure upstream of the turbine 3 is too great. In such cases, the proportion of the exhaust gas permitted to bypass the turbine 3 is controlled so as to maintain the turbine 3 at a second pre-set rotational speed that is slightly greater than the first. The turbine's preset speeds are chosen to maximize electrical generating efficiency and for turbine safety. The system maximizes the amount of electricity generated, avoids excessive exhaust gas back-pressure on the engine 1, and avoids overloading the electrical system 17.

24 Claims, 12 Drawing Sheets

(51) Int. Cl.
*F01N 5/04* (2006.01)
*F02D 29/06* (2006.01)
*F02B 41/10* (2006.01)
*H02P 9/04* (2006.01)
*F01N 3/28* (2006.01)

(52) U.S. Cl.
CPC ........ *F01N 3/2892* (2013.01); *F01N 2410/00* (2013.01); *F02B 37/00* (2013.01); *Y02T 10/16* (2013.01); *Y02T 10/163* (2013.01)

(58) Field of Classification Search
CPC ... F01D 5/02; F02D 29/06; F01N 5/04; F01N 3/2892; F01N 2410/00; Y02T 10/163
USPC ........................................ 60/602, 605.2, 624
See application file for complete search history.

(56) References Cited

U.S. PATENT DOCUMENTS

| | | | |
|---|---|---|---|
| 7,628,015 B2 * | 12/2009 | Marumoto | F02B 33/34 60/607 |
| 8,141,360 B1 * | 3/2012 | Huber | B60K 6/24 290/40 B |
| 2011/0018267 A1 | 1/2011 | Oriet | |

FOREIGN PATENT DOCUMENTS

| | | |
|---|---|---|
| JP | 2000045817 | 2/2000 |
| WO | 2009022109 | 8/2008 |
| WO | 2011161408 | 6/2011 |

OTHER PUBLICATIONS

Development of an Exhaust Driven Turbine-Generator Integrated Gas Energy Recovery System (TIGERS). A. Haughton, et al. 8 pages.
Combined Search and Examination Report for GB1318644.0, mailed May 12, 2014.
Further Search Report for GB1318644.0, mailed Jul. 8, 2014. (claims 7 &10).
Further Search Report for GB1318644.0, mailed Jul. 8, 2014. (claims 3 & 5).
Further Search Report for GB1318644.0, mailed Jul. 8, 2014. (claims 13 &16).

* cited by examiner

GENERATION OF ELECTRICITY FROM EXHAUST GAS

CROSS-REFERENCE TO RELATED APPLICATIONS

The present application claims priority to International Application No. PCT/GB2014/051264 filed on Apr. 23, 2014, which claims priority to Great Britain Patent Application Nos. 1307610.4 filed on Apr. 26, 2013 and 1318644.0 filed on Oct. 22, 2013.

STATEMENT RE: FEDERALLY SPONSORED RESEARCH/DEVELOPMENT

Not Applicable

BACKGROUND

1. Field of the Invention

The present invention relates to a system and method for generating electricity from the exhaust gas of an internal combustion engine. Preferably the engine is a piston engine. The engine may be the engine of a vehicle, for example the main drive engine for a land, air or water vehicle or a "range extender" engine for a hybrid internal combustion/electric vehicle, or it may be a non-vehicle engine such as a static engine to power an electric generator set.

2. Description of the Related Art

It is known to generate electricity using a generator that is driven by a turbine that is in turn driven by the exhaust gas from an internal combustion engine of a vehicle. For example, US 2011/0018267 discloses a hybrid vehicle in which the exhaust gas from a diesel engine powers an exhaust turbine generator. In order to avoid the weight of batteries carried in the vehicle, for storing the electricity generated in this way, the electricity is used to drive an electric motor of the hybrid vehicle, and a bypass gate is provided so that if the generator produces more electric power than can be used by the electric motor, the bypass gate is opened so that exhaust gas bypasses the turbine, and therefore excess electricity is not generated.

BRIEF SUMMARY

An aspect of the present invention provides a method of controlling a system for generating electricity from the exhaust gas of an internal combustion engine, wherein the system comprises a turbine arranged to be driven by the exhaust gas; an electrical generator arranged to be driven by the turbine; and a bypass path for exhaust gas to flow bypassing the turbine, and wherein the method comprises controlling the torque applied to a rotor of the turbine by the generator so as to maintain a constant rotor speed, provided that the electrical current generated by the generator does not exceed a limiting value of current, and controlling the speed of the rotor of the turbine by diverting some gas flow along the bypass path in the case that the limiting value of current is reached.

Another aspect of the present invention provides a system for generating electricity from the exhaust gas of an internal combustion engine comprising a turbine arranged to be driven by the exhaust gas; an electrical generator arranged to be driven by the turbine; and a bypass path for exhaust gas to flow bypassing the turbine, wherein the system is arranged to control the torque applied to a rotor of the turbine by the generator so as to maintain a constant rotor speed provided that the electrical current generated by the generator does not exceed a limiting value of current, and is arranged to control the speed of the rotor of the turbine by diverting some gas flow along the bypass path in the case that the limiting value of current is reached.

Another aspect of the present invention provides a method for generating electricity from the exhaust gas flow from an internal combustion engine of a vehicle, comprising using the exhaust gas to drive a turbine, using the turbine to drive a generator, controlling the electrical power output from the generator so as to control the torque applied by the generator to the turbine so as to maintain the turbine at a constant speed, and, in the case that the vehicle's electrical system cannot accept an increase in current from the generator, controlling the turbine speed by diverting a proportion of the exhaust gas flow to bypass the turbine.

Another aspect of the present invention provides a system for generating electricity from the exhaust gas flow from an internal combustion engine of a vehicle, comprising: a turbine arranged to be driven by the exhaust gas, a generator arranged to be driven by the turbine, and a control system for controlling the electrical power output from the generator so as to control the torque applied by the generator to the turbine so as to maintain the turbine at a constant speed, wherein the control system is arranged to control the turbine speed, in the case that the vehicle's electrical system cannot accept an increase in current from the generator, by diverting a proportion of the exhaust gas flow to bypass the turbine.

Another aspect of the present invention provides a method of controlling a system for generating electricity from the exhaust gas flow from an internal combustion engine (e.g. a piston engine), wherein the system comprises: a turbine to be driven by the exhaust gas flow; an electricity generator to be driven by the turbine; and a bypass path that enables exhaust gas flow from the engine to bypass the turbine, and wherein the method comprises: adjusting the relative proportions of (a) exhaust gas flow through the turbine and (b) exhaust gas flow through the bypass path, in response to the speed of rotation of the turbine; and adjusting the electric current output from the generator in response to the actual or predicted pressure of the exhaust gas at a position upstream of the turbine and the bypass path.

Another aspect of the present invention provides a system for generating electricity from the exhaust gas flow from an internal combustion engine (e.g. a piston engine), comprising a turbine to be driven by the exhaust gas flow, an electricity generator to be driven by the turbine, and a bypass path that enables exhaust gas flow from the engine to bypass the turbine, wherein the system is arranged to adjust the relative proportions of (a) exhaust gas flow through the turbine and (b) exhaust gas flow through the bypass path, in response to the speed of rotation of the turbine; and to adjust the electric current output from the generator in response to the actual or predicted pressure of the exhaust gas at a position upstream of the turbine and the bypass path.

Preferably the electric current output by the generator is adjusted in response to the speed of rotation of the turbine so as to maintain the speed of rotation of the turbine at or below a first set speed (more preferably at the first set speed), provided that the electric current output of the generator does not exceed a current limit.

Preferably the relative proportions of (a) exhaust gas flow through the turbine and (b) exhaust gas flow through the bypass path, are adjusted in response to the speed of rotation of the turbine so as to try to maintain the speed of rotation of the turbine at or below a second set speed (more preferably at the second set speed), the second set speed being faster than the first set speed.

Another aspect of the present invention provides a method of controlling a system for generating electricity from the exhaust gas flow from an internal combustion engine (e.g. a piston engine), wherein the system comprises: a turbine to be driven by the exhaust gas flow; an electricity generator to be driven by the turbine; and a bypass path that enables exhaust gas flow from the engine to bypass the turbine, and wherein the method comprises: adjusting the electric current output from the generator in response to the speed of rotation of the turbine so as to maintain the speed of rotation of the turbine at or below a first set speed (preferably at the first set speed), provided that the electric current output of the generator does not exceed a current limit; and at least in the case that the electric current output of the generator reaches or exceeds the current limit, adjusting the relative proportions of (a) exhaust gas flow through the turbine and (b) exhaust gas flow through the bypass path, in response to the speed of rotation of the turbine so as to maintain the speed of rotation of the turbine at or below a second set speed (more preferably at the second set speed), the second set speed being higher than the first set speed.

Another aspect of the present invention provides a system for generating electricity from the exhaust gas flow from an internal combustion engine (e.g. a piston engine), comprising a turbine to be driven by the exhaust gas flow, an electricity generator to be driven by the turbine, and a bypass path that enables exhaust gas flow from the engine to bypass the turbine, wherein the system is arranged to adjust the electric current output from the generator in response to the speed of rotation of the turbine so as to maintain the speed of rotation of the turbine at or below a first set speed (preferably at the first set speed), provided that the electric current output of the generator does not exceed a current limit; and at least in the case that the electric current output of the generator reaches or exceeds the current limit, to adjust the relative proportions of (a) exhaust gas flow through the turbine and (b) exhaust gas flow through the bypass path, in response to the speed of rotation of the turbine so as to maintain the speed of rotation of the turbine at or below a second set speed (more preferably at the second set speed), the second set speed being higher than the first set speed.

Preferably the electric current output from the generator, or the said current limit, is reduced if the actual or predicted pressure of the exhaust gas at a position upstream of the turbine and the bypass path exceeds a pressure limit.

Another aspect of the present invention provides a method of controlling a system for generating electricity from the exhaust gas flow from an internal combustion engine (e.g. a piston engine), wherein the system comprises: a turbine to be driven by the exhaust gas flow; and an electricity generator to be driven by the turbine; and wherein the method comprises: adjusting the electric current output from the generator in response to the speed of rotation of the turbine, provided that the electric current output of the generator does not exceed a current limit; and reducing the electric current output from the generator, or reducing the said current limit, if the actual or predicted pressure of the exhaust gas at a position upstream of the turbine exceeds a pressure limit.

Another aspect of the present invention provides a system for generating electricity from the exhaust gas flow from an internal combustion engine (e.g. a piston engine) comprising a turbine to be driven by the exhaust gas flow and an electricity generator to be driven by the turbine, wherein the system is arranged to adjust the electric current output from the generator in response to the speed of rotation of the turbine, provided that the electric current output of the generator does not exceed a current limit; and to reduce the electric current output from the generator, or reduce the said current limit, if the actual or predicted pressure of the exhaust gas at a position upstream of the turbine exceeds a pressure limit.

Preferably the system further comprises a bypass path, downstream of the said position, that enables exhaust gas flow from the engine to bypass the turbine, and the relative proportions of (a) exhaust gas flow through the turbine and (b) exhaust gas flow through the bypass path, are adjusted in response to the speed of rotation of the turbine, at least in the case that the electric current output of the generator reaches or exceeds the current limit.

Preferably the electric current output from the generator is adjusted in response to the speed of rotation of the turbine, provided that the electric current output of the generator does not exceed a current limit, so as to maintain the speed of rotation of the turbine at or below a first set speed (more preferably at the first set speed), and at least in the case that the electric current output of the generator reaches or exceeds the current limit, the relative proportions of (a) exhaust gas flow through the turbine and (b) exhaust gas flow through the bypass path, are adjusted in response to the speed of rotation of the turbine so as to maintain the speed of rotation of the turbine at or below a second set speed (more preferably at the second set speed), the second set speed being higher than the first set speed.

Preferably the generator is a switched reluctance generator. Preferably the generator has a controller that controls the amount of electric current output by the generator in response to a received "current demand" signal that informs the controller about the level of current that is required. The electric current output from the generator can be adjusted by adjusting the current demand signal.

In an embodiment, a turbo-generator system generates electricity from the exhaust gas of an internal combustion engine. The electric current generated by the generator (e.g. a switched reluctance machine) is controlled so as to maintain the turbine at a first pre-set rotational speed. The amount of electric current demanded from the generator is limited or reduced if the electrical system receiving the current (e.g. the electrical system of a vehicle or other apparatus to which the internal combustion engine is fitted) cannot accept a greater electric current or if the exhaust gas pressure upstream of the turbine is too great. In such cases, the proportion of the exhaust gas permitted to bypass the turbine is controlled so as to maintain the turbine at a second pre-set rotational speed that is slightly greater than the first. The turbine's preset speeds are chosen to maximise electrical generating efficiency and for turbine safety. The system maximises the amount of electricity generated, avoids excessive exhaust gas back-pressure on the internal combustion engine, and avoids overloading the electrical system.

BRIEF DESCRIPTION OF THE DRAWINGS

Embodiments of the present invention, given by way of non-limiting example, will now be described with reference to the accompanying drawings.

DETAILED DESCRIPTION

Figure 1:
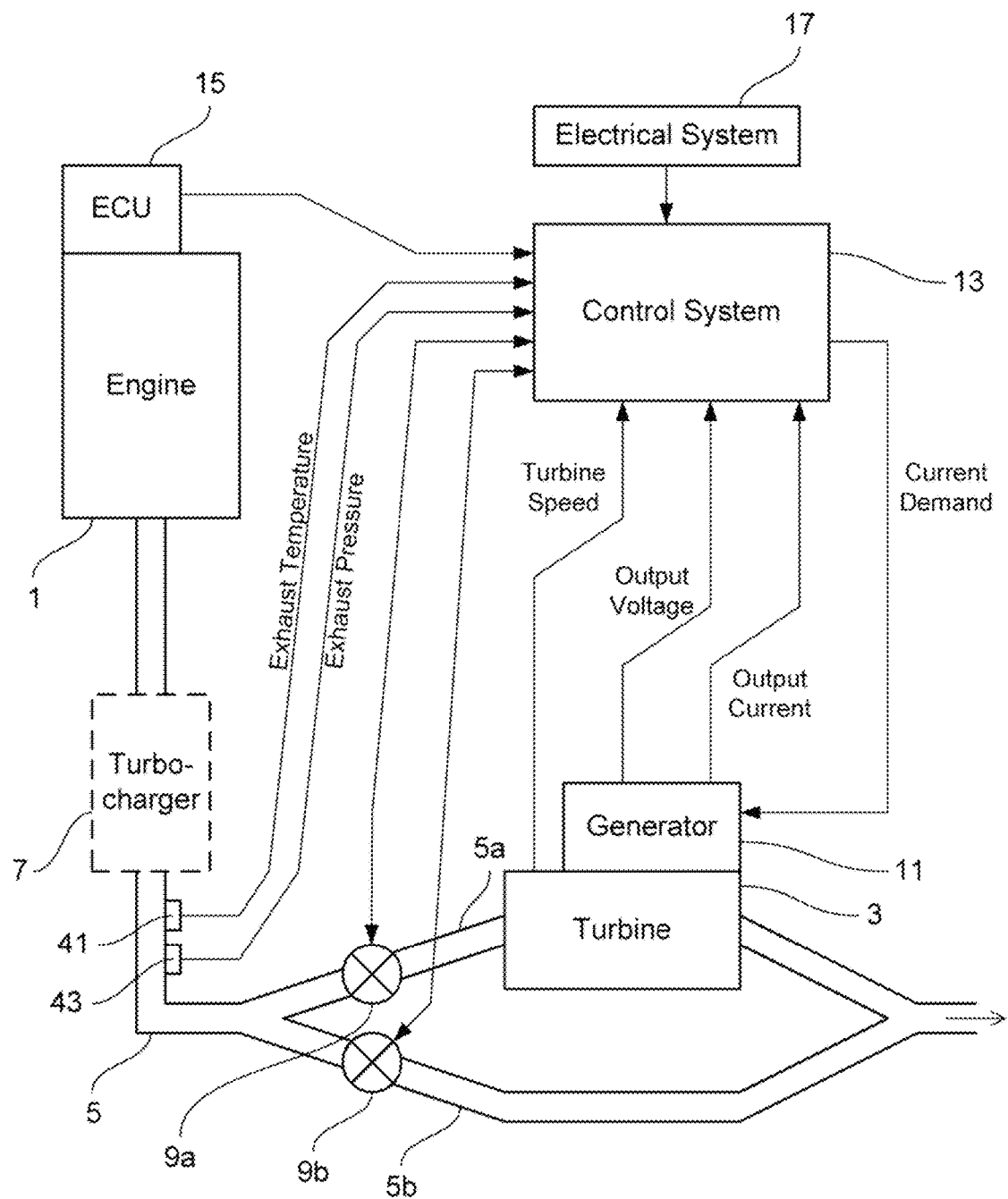
FIG. 1 shows a turbo-generator system according to an embodiment of the present invention.

FIG. 1 shows schematically the major components of an embodiment of the present invention, connected to the exhaust system of an internal combustion engine. An engine 1 for a land vehicle is an internal combustion piston engine. It may be either a diesel (compression ignition) engine or a gasoline (Otto cycle or spark ignition) engine. A turbine 3 is arranged to be driven by exhaust gas from the engine 1, flowing in the exhaust path 5 from the engine 1. Optionally, a turbocharger 7 is also provided in the exhaust path 5 to be driven by exhaust gas. In this case, the turbine 3 is arranged downstream of the turbocharger 7. The exhaust path 5 splits upstream of the turbine 3, into a turbine path 5a and a bypass path 5b. A turbine path valve 9a controls exhaust gas flow in the turbine path 5a, and a bypass path valve 9b controls exhaust gas flow in the bypass path 5b. The turbine 3 is arranged to drive an electrical generator 11, preferably through a mechanical linkage. The generator 11 may be arranged to rotate on the same shaft as the turbine 3, but this is not essential. Preferably, the generator 11 is a switched-reluctance generator. While the engine 1 is running, exhaust gas from the engine flows along the exhaust path 5 and, to the extent that the turbine path valve 9a allows it to flow along the turbine path 5a, the exhaust gas flow rotates the turbine 3, enabling the generator 11 to generate electricity.

The generator 11 includes control circuitry that controls the amount of current generated in it. As the amount of current, generated in the generator 11, increases so does the power required by the generator 11, and therefore the torque applied by the generator 11 to the turbine 3 also increases. A control system 13 controls the generator 11 by sending a "current demand" signal, which tells the generator 11 how much electric current to output. The "current demand" signal also indirectly controls the turbine 3, since the amount of current output by the generator 11 affects the torque applied to the turbine 3. The control system 13 also controls the valves 9a, 9b, and thereby controls the relative proportions of the exhaust gas flow through the turbine 3 and along the bypass path 5b.

The engine 1 is controlled by an engine control unit (ECU) 15. The ECU 15 sends engine control information to the control system 13, such as information about the throttle position and engine speed. The control system 13 also receives information from the vehicle's electrical system 17, including information about the existing level of electrical demand in the system from time to time, and possibly information from a battery management system. Additionally, the control system 13 receives signals giving it information about the temperature and gas pressure in the exhaust path 5 upstream of the turbine 3, information about the positions of the turbine path valve 9a and the bypass path valve 9b, the rotational speed of the turbine 3, and the output current and output voltage from the generator 11. The control system 13 uses this information to determine the control signals to be sent to the turbine path valve 9a and bypass path valve 9b for controlling the proportion of the exhaust gas flow that flows through the turbine 3 relative to the proportion that flows along the bypass path 5b, and also to determine the level of the "current demand" signal to be sent to the generator 11.

During normal operation, while the generator 11 is generating electric current, the control system will use the "current demand" signal to control the level of current generated by the generator 11 so as to maintain the rotation of the turbine 3 to a predetermined speed target (also known as a speed set point). If the turbine speed increases beyond the target, the "current demand" signal is increased, so that the generator 11 increases its output current and thereby increases the torque applied to the turbine 3, slowing the turbine 3 back down to the set point speed (target speed). Similarly, if the speed of the turbine 3 falls below its set point, the "current demand" is reduced, so that the generator 11 generates less electric current, reducing the torque and allowing the turbine 3 to speed up. In this way, the system generates the maximum amount of electricity possible while keeping the turbine 3 operating at the desired speed.

This current-based control loop for controlling the speed of the turbine 3 can cease to be effective for two reasons. First, the control system 13 ensures that the generator 11 does not output more electric current than the electrical system of the vehicle can receive. Therefore the control system 13 is operating to a maximum current limit, determined in accordance with the information received from the electrical system 17 of the vehicle. Accordingly, if the maximum current limit is reached, the "current demand" signal cannot be increased even if the turbine speed increases. In this case, the current-based control loop will cease to control the turbine 3, and the turbine speed will rise above its set point value.

Second, if the torque applied to the turbine 3 increases, the turbine 3 provides a greater resistance to gas flow through it and therefore there is a greater pressure drop across the turbine 3. This results in an increase in the gas pressure in the exhaust path 5 upstream of the turbine 3. This gas pressure affects the operation of the engine 1 since it provides a back pressure opposing the exhaust stroke of the engine 1. Additionally, if a turbocharger 7 is present then the gas pressure in the exhaust path 5 between the turbocharger 7 and the turbine 3 affects the pressure drop across the turbocharger 7 and therefore affects the ability of the turbocharger 7 to extract the energy it needs from the exhaust gas flow. Accordingly, a limit is set to the exhaust gas pressure in the exhaust path 5 upstream of the turbine 3. This exhaust gas pressure limit will vary depending on the operating parameters of the engine 1. For example, if a turbocharger 7 is present and has been idling, and subsequently the turbocharger 7 is required to operate, it is preferable to reduce the exhaust path gas pressure limit downstream of the turbocharger 7 in order to provide a suitable pressure drop across the turbocharger 7. Similarly, if there is an increase in the amount of power demanded from the engine 1, and the throttle position is opened, the engine 1 needs to speed up as quickly as possible. It is preferable to assist this by reducing the exhaust path gas pressure limit temporarily. If the actual exhaust path gas pressure at any time exceeds the pressure limit at that time, whether because the pressure limit has reduced, or because an increase in current output from the generator 11 has increased the torque in the turbine 3, or because there has been an increase in the mass of exhaust gas flowing in the exhaust path 5, the control system 13 will reduce the "current demand" signal so as to reduce the amount of current output from the generator 11 and thereby reduce the torque on the turbine 3. This allows the turbine 3 to speed up, and the turbine speed may rise above its set point value.

The increase in the turbine speed, that occurs when the current-based control loop ceases to limit the turbine speed, is undesirable. Therefore a bypass-based control loop is used to limit the speed of the turbine 3 under these circumstances. In the bypass-based control loop, the control system 13 responds to the turbine speed by adjusting the positions of the turbine path valve 9a and the bypass path valve 9b so as to vary the relative proportions of the exhaust gas flow that pass through the turbine 3 and that bypass it along the bypass path 5b. In this way, the control system 13 uses the bypass path 5b to control the turbine speed to a set point value. As explained below, the turbine speed set point value for the bypass-based control loop is slightly faster than the set point value for turbine speed in the current-based control loop. As the bypass path valve 9b opens, and some of the exhaust gas flow begins to flow along the bypass path 5b, this provides an alternative path for the exhaust gas to flow from the part of the exhaust path 5 upstream of the turbine 3. Therefore the exhaust path gas pressure is reduced. This reduces the pressure drop across the turbine 3. Also, the mass of exhaust gas flowing through the turbine 3 is reduced. As a result, the turbine 3 slows down. Under these circumstances, the generator 11 continues to generate electrical current, but the level of current is no longer used to control the speed of the turbine 3.

If the "current demand" signal had been limited or reduced because the exhaust gas pressure had reached or exceeded its limit, the operation of the bypass-based control loop will have the effect of increasing the proportion of the exhaust gas flow that bypasses the turbine 3 and thereby reducing the exhaust gas pressure upstream of the turbine 3. In this way, the current-based control loop and the bypass-based control loop interact to provide control of the exhaust gas pressure.

Figure 2:
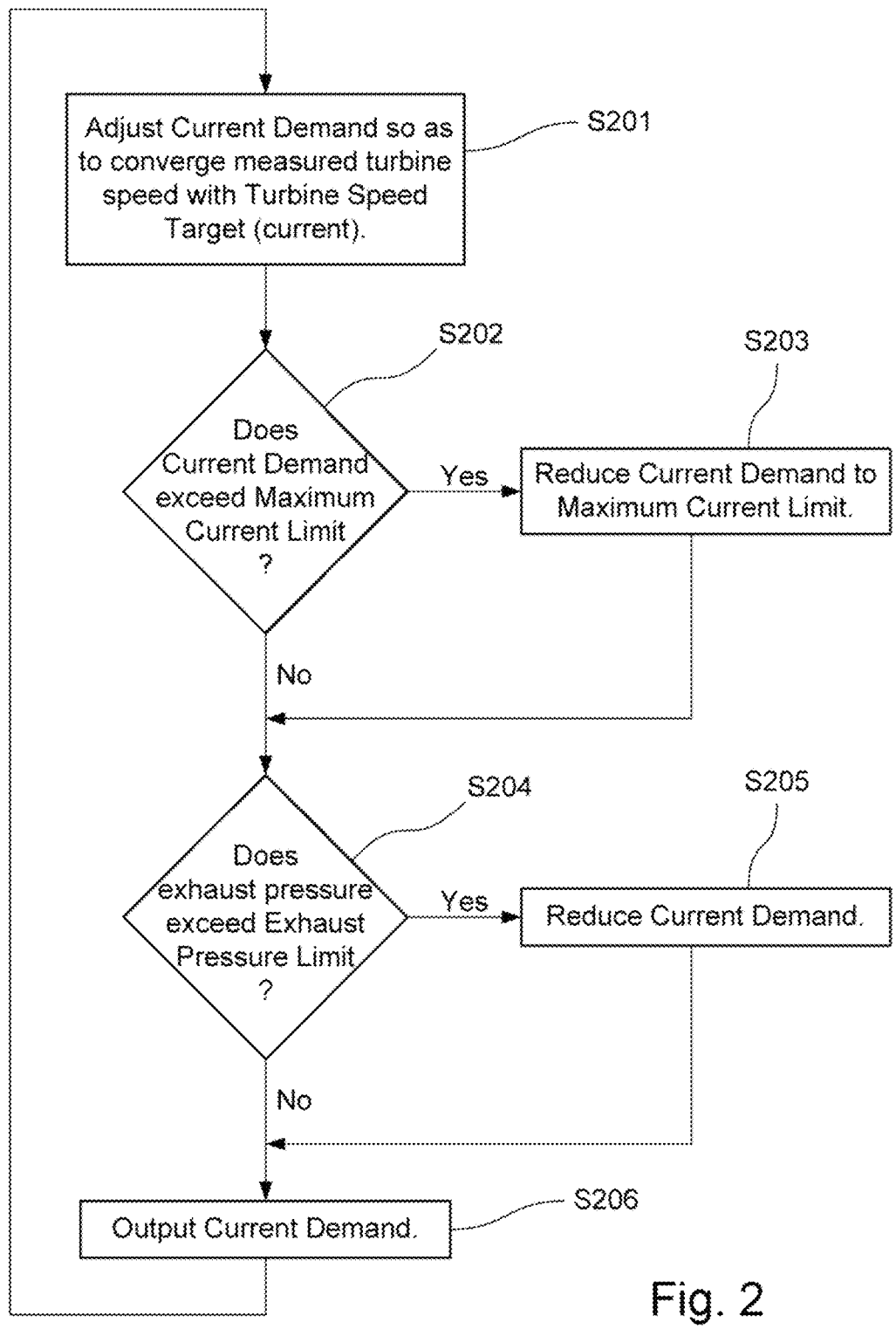
FIG. 2 is a flow diagram for a current-based control loop used to control the system of FIG. 1.

FIG. 2 is a flow diagram that illustrates the logic of the current-based control loop. In step S201 the turbine speed, as determined e.g. from a shaft encoder on the turbine, is compared with a set point value referred to as "turbine speed target (current)". The existing value of the current demand signal is then adjusted in view of the difference between the measured turbine speed and the target value so as to reduce the difference. The new value for the current demand signal is output from step S201. In step S202 the value of the current demand signal is compared with the maximum current limit. Provided that the maximum current limit is not exceeded, flow passes to step S204. However, if the maximum current limit is exceeded then flow passes to step S203, in which the value of the current demand signal is reduced to the value of the maximum current limit, before flow passes to step S204. In step S204 a check is made to determine whether the present value of the exhaust pressure exceeds an exhaust pressure limit. If the exhaust pressure limit is not exceeded, flow passes to step S206. If the exhaust pressure limit is exceeded flow passes to step S205, where the value for the current demand signal is reduced before flow passes to step S206. In step S206 the current demand signal is output, with whatever value is has when flow reaches step S206. Flow then returns to step S201.

It can be seen that so long as the processing flow through FIG. 2 follows the output "No" at both of steps S202 and S204, the value of the current demand signal will be as determined in step S201 and the current output by the generator 11 will be controlled so that the speed of the turbine 3 remains close to the set point value determined by the turbine speed target (current). However, if either the maximum current limit or the exhaust pressure limit is reached, so that flow follows the path "Yes" at either step S202 or step S204, the value of the current demand signal as output in step S206 will be lower than the value calculated in step S201. In this case, the generator 11 will no longer output sufficient current to generate sufficient torque to hold down the speed of the turbine 3, and the torque generated by gas flow through the turbine 3 will accelerate it to a speed higher than the turbine speed target (current).

Figure 3:
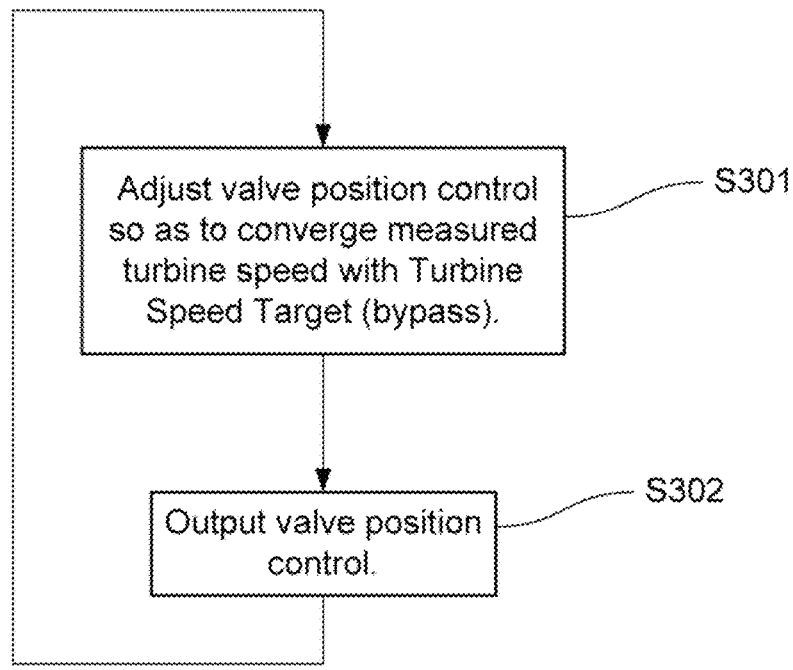
FIG. 3 is a flow diagram for a bypass-based control loop used to control the system of FIG. 1.

FIG. 3 is a flow diagram illustrating the logic of the bypass-based control loop. In step S301, the actual turbine speed as measured in the turbine 3 is compared with a set point value referred to as "turbine speed target (bypass)". If there is a difference between the measured turbine speed and the target speed, the valve position control signal or signals are adjusted so as slightly to close or open the turbine path valve 9a and open or close the bypass path valve 9b so as to vary the relative proportions of the exhaust gas flow through the turbine path 5a and the turbine 3 and thereby reduce the difference between the measured turbine speed and the turbine speed target (bypass). Then in step S302 the valve position control signal or signals are output to control the valves, and the loop returns to step S301. In this way, the positions of the valves 9a, 9b are adjusted so as to hold the speed of the turbine 3 at the turbine speed target (bypass).

Although the control system 13 may be set up so that the bypass-based control loop of FIG. 3 only operates if the current-based control loop of FIG. 2 loses control of the turbine speed, it is also possible for both control loops to operate simultaneously. The control system 13 sets the turbine speed target (bypass), used in the bypass-based control loop of FIG. 3, to be slightly higher than the turbine speed target (current) used in the current-based control loop of FIG. 2. In this case, the two control loops will interact in the following manner.

If the turbine speed is greater than the turbine speed target (current) the current-based control loop will increase the "current demand" signal, causing the generator 11 to output more electrical current. This increases the torque applied to the turbine 3, slowing it down so that its speed approaches the turbine speed target (current). This means that the turbine speed is lower than the turbine speed target (bypass) used in the bypass-based control loop. Accordingly, if the bypass path valve 9b is not completely closed, the bypass-based control loop of FIG. 3 will change the positions of the turbine path valve 9a and the bypass path valve 9b so as to reduce flow through the bypass path 5b and increase flow through the turbine path 5a, providing more exhaust gas flow through the turbine 3 and speeding it up again. The current-based control loop will respond to the increase in speed of the turbine by further increasing the output current from the generator 11, in turn causing the bypass-based control loop to shift gas flow yet further from the bypass path 5b into the turbine path 5a. Ultimately, the bypass-based control loop will reach the point where the bypass path valve 9b is completely closed and all of the exhaust gas flow is through the turbine 3. At this point, all of the energy in the exhaust gas flow along the exhaust path 5 is being delivered to the turbine 3, and the current-based control loop is maximising the amount of electrical energy that can be generated using the exhaust gas flow.

If the amount of electrical current generated by the generator 11 has to be limited, either because it has reached the limit of electric current that can be used in the vehicle or in order to prevent the turbine 3 from applying excessive back pressure to the engine 1 (or to the turbocharger 7 if fitted), the speed of the turbine 3 increases until it reaches the turbine speed target (bypass). At this point, the bypass-based control loop begins to exercise control over the turbine speed by beginning to open the bypass path valve 9b and beginning to close the turbine path valve 9a, allowing some of the exhaust gas in the exhaust path 5 to take the bypass path 5b. Accordingly, not all of the energy in the gas flow in the exhaust path 5 is applied to the turbine 3, allowing the speed of the turbine 3 to be limited even though the generator 11 is only extracting a reduced amount of energy from the exhaust gas flow. The bypass-based control loop also allows the pressure in the exhaust path 5 to be reduced if necessary without driving the turbine 3 at an excessive speed.

If engine conditions change and the exhaust gas flow in the exhaust path 5 reduces, the turbine 3 will slow down. Equally, if the exhaust pressure limit increases owing to a change in engine conditions or the maximum current limit increases owing to a change in electrical conditions, the current-based control loop will cause the generator 11 to output more electric current, and this also will slow down the turbine 3. The bypass-based control loop will respond to the reduction in turbine speed by tending to open the turbine path valve 9a and close the bypass path valve 9b until either the turbine speed increases to meet the turbine speed target (bypass) or the bypass path 5b is fully closed and all of the exhaust gas flow is once again flowing through the turbine 3. In this way, the speed of the turbine 3 is kept approximately constant, and the maximum amount of electric current is generated within the limits permitted by the maximum current limit and the exhaust pressure limit, with control of the turbine speed passing between the current-based control loop and the bypass-based control loop depending on engine conditions and electrical conditions.

Figure 4:
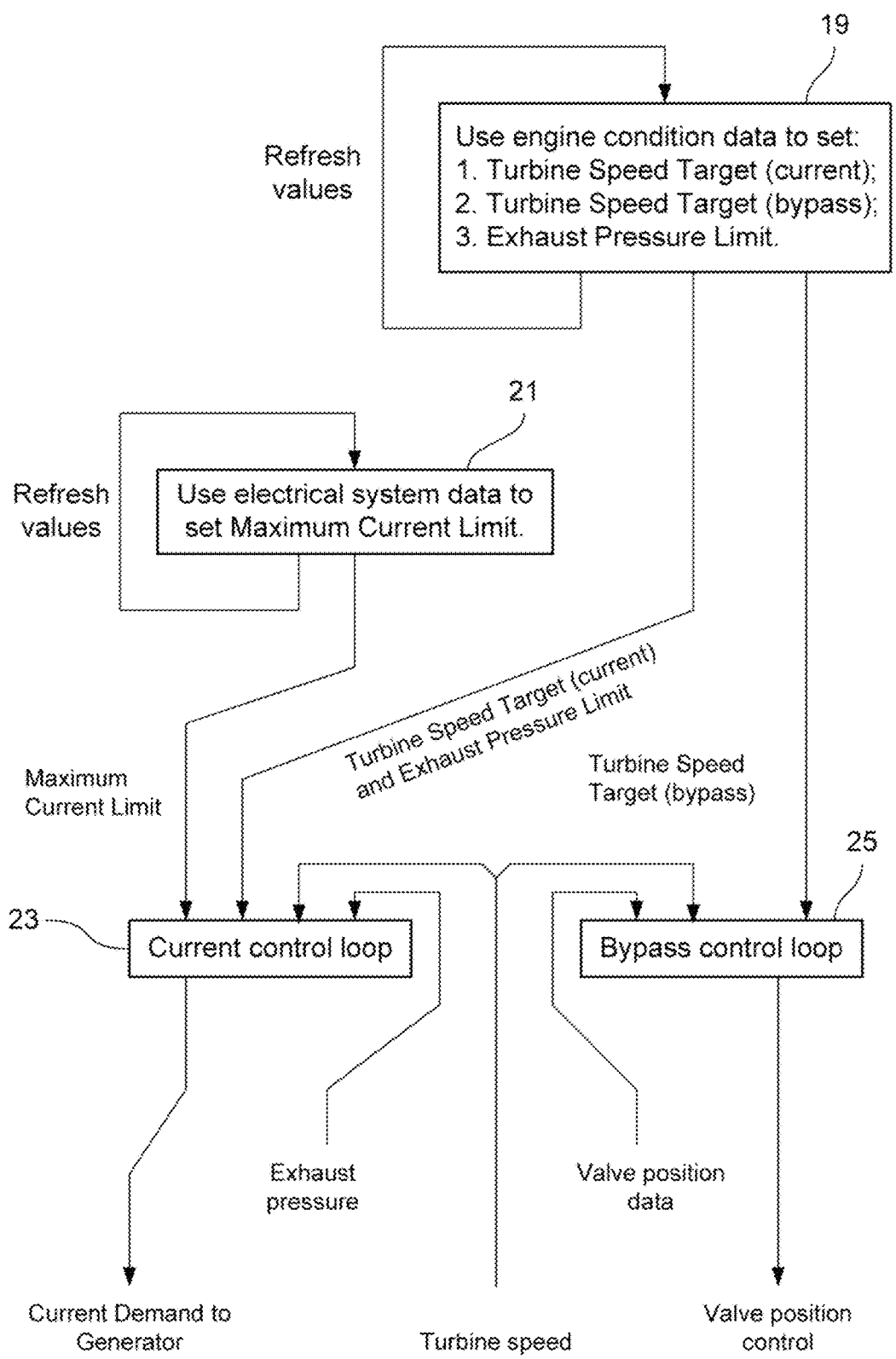
FIG. 4 shows diagrammatically the operations used to control used to control the system of FIG. 1.

The current-based control loop of FIG. 2 and the bypass-based control loop of FIG. 3 fit together in an overall control logic as shown in FIG. 4. In FIG. 4 an engine condition-based routine 19 uses engine condition data from the ECU 15, possibly together with other engine-related data such as the exhaust gas pressure and the exhaust gas temperature, to calculate the turbine speed target (current), the turbine speed target (bypass), and the exhaust pressure limit. This routine needs to run continuously, or to be run in response to changes in some of the inputs received by the control system 13, to ensure that at least the exhaust pressure limit is updated as engine conditions change. The turbine speed targets may also be changed from time to time, for example in response to changes in the mass flow rate through the exhaust path 5, to ensure that the turbine speed target (current) is appropriate for the most efficient extraction of energy from the gas flow through the turbine 3.

Simultaneously, an electrical system-based routine 21 receives electrical system data and determines the maximum current limit. Again, this routine needs to run continuously or to be triggered by changes in particular inputs to the control system 13 to ensure that the maximum current limit is adjusted as electrical conditions vary. For example, if the battery is partially drained and needs to be charged this implies that a certain amount of electrical current can be sunk by the battery, but as the battery approaches the fully charged state there will be a decrease in the amount of current that can be sunk. Additionally, the maximum current limit will change as relatively high-drain electrical components, such as window heaters and air conditioning compressors, are switched on and off.

A current control loop 23, which is the current-based control loop of FIG. 2, receives the turbine speed target (current) and the exhaust pressure limit from the engine condition-based routine 19 and receives the maximum current limit from the electrical system-based routine 21, and also receives input values for the exhaust gas pressure and the turbine speed, and outputs the "current demand" signal to the generator 11.

A bypass control loop 25, which is the bypass-based control loop of FIG. 3, receives the turbine speed target (bypass) from the engine condition-based routine 19, and also receives valve position data indicating the positions of the valves 9a, 9b and data indicating the turbine speed, and outputs the valve position control signal or signals to control the positions of the valve 9a, 9b.

Figure 5:
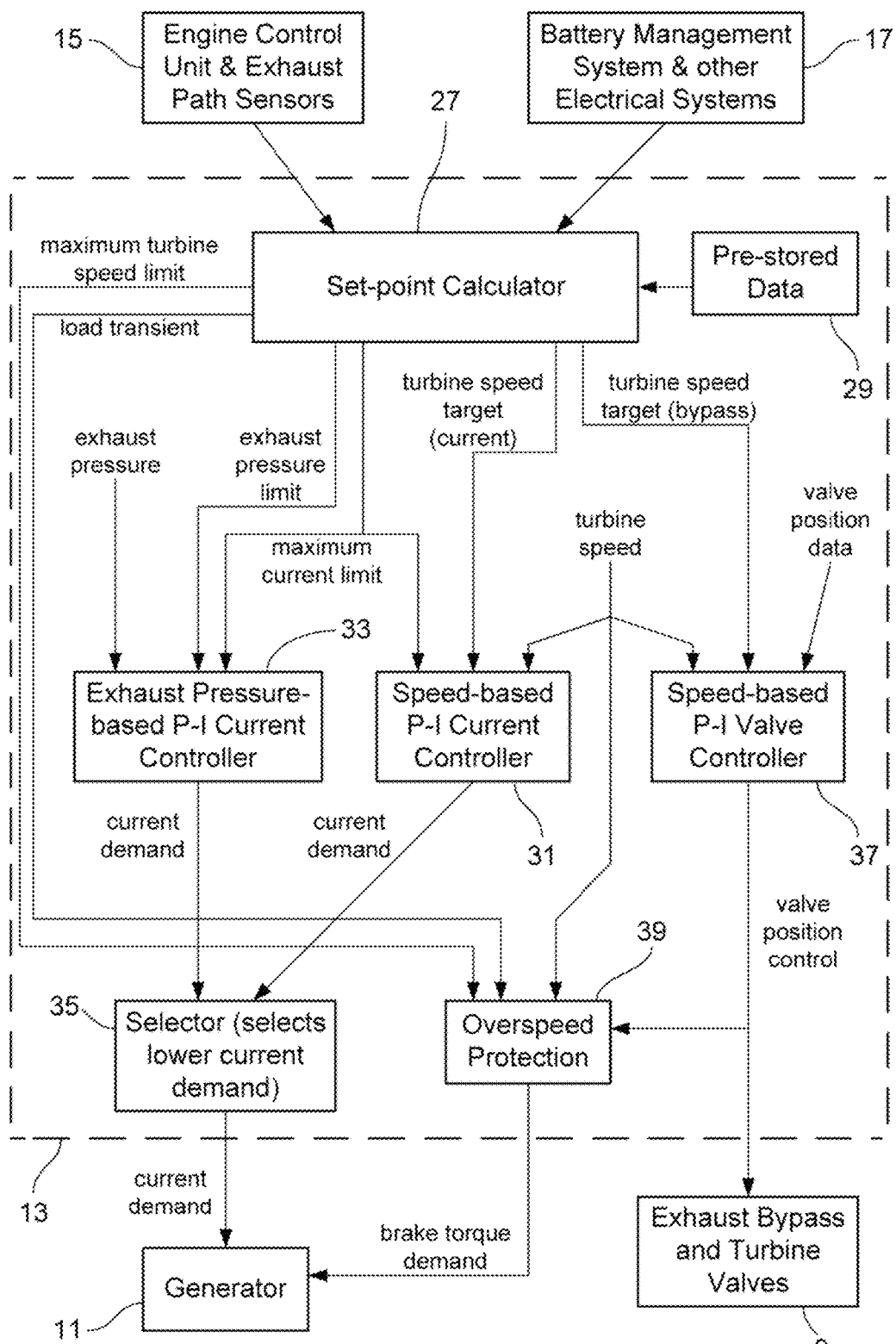
FIG. 5 is a logical block diagram of the main components of the control system of FIG. 1.

Although FIGS. 2 to 4 show the logic of the operation of the control system 13, they do not necessarily represent the internal construction and operation of the control system 13. For example, the control system 13 may be made up of a number of components as shown in FIG. 5, which operates slightly differently from the flow diagrams of FIGS. 2 and 3 but which provide the same overall logical outcome. The individual components shown in FIG. 5 may use analogue or digital processing, or a mixture of both, and may be implemented in software or hardware or a mixture of both.

In FIG. 5 a set point calculator 27 receives engine-related data from the engine control unit 15 and sensors in the exhaust path, and receives electrical system information from a battery management system and other electrical systems 17 in the vehicle, and uses these to calculate the exhaust pressure limit, the maximum current limit, the turbine speed target (current) and the turbine speed target (bypass). The set point calculator 27 also makes use of pre-stored data 29. This provides information such as the maximum speed that is permitted for the turbine 3 in order to avoid damaging it, and tables relating the optimum target speed for the turbine to engine condition information such as the mass flow rate along the exhaust path 5. The set point calculator 27 selects the turbine speed target (current) for most efficient extraction of energy from the exhaust gas flow, provided that the target speed is kept below the maximum permitted turbine speed by a suitable safety margin. The turbine speed target (bypass) is set to be slightly higher than the turbine speed target (current), for example by a predetermined offset.

The amount of the offset between the turbine speed targets may, for example, be 5000 rpm. It is chosen so that the normal variation of the turbine speed around the turbine speed target (current), during operation of the current-based control loop, does not reach the turbine speed target (bypass). This avoids any action by the bypass-based control loop to reduce the turbine speed while the current-based control loop is also controlling the turbine speed. However, the difference between the two turbine speed targets should be kept sufficiently small that the bypass-based control loop begins to control the turbine speed promptly after the current-based control loop loses control. Also, the turbine speed target (bypass) should be well below the maximum turbine speed limit, in order to avoid damage to the turbine 3.

A speed-based proportional-integral (P-I) current controller 31 receives the turbine speed target (current) from the set point calculator 27 and also receives the actual turbine speed, and outputs a current demand value. It conducts proportional-integral control, based on the actual turbine speed and the turbine speed target (current), to adjust its current demand value output. During the periods when the turbine speed is controlled by the current demand value output by the P-I current controller 31, the controller 31 will vary its output current demand value so as to make the actual turbine speed match the turbine speed target (current). However, if the actual turbine speed continues to be greater than the turbine speed target (current), the current demand value output from the speed-based P-I current controller 31 will increase until it saturates at a maximum value. This controller 31 also receives the maximum current limit from the set point calculator 27, and it is arranged so that when the current demand value output from it saturates, the current demand value is equal to the maximum current limit.

An exhaust pressure-based proportional-integral (P-I) current controller 33 receives the exhaust pressure limit from the set point calculator 27 and also receives the actual exhaust pressure, and outputs a current demand value. It conducts proportional-integral control, based on the actual exhaust pressure and the exhaust pressure limit, to adjust its current demand value output. If the generator 11 responds to the current demand value output by the exhaust pressure-based P-I current controller 33, this will affect the turbine speed, and that will in turn affect the actual exhaust pressure. Under these circumstances, the controller 33 will vary its output current demand value so as to make the actual exhaust pressure match the exhaust pressure limit. However, if the exhaust pressure continues to be lower than the exhaust pressure limit, the current demand value output from the exhaust pressure-based P-I current controller 33 will increase until it saturates at a maximum value. This controller 33 also receives the maximum current limit from the set point calculator 27, and it is arranged so that when the current demand value output from it saturates, the current demand value is equal to the maximum current limit.

The current demand value output from the speed-based P-I current controller 31 and the current demand value output from the exhaust pressure-based P-I current controller 33 are input to a selector 35. The selector 35 compares the two current demand values, selects whichever current demand value is lower, and outputs the selected value as the current demand signal to the generator 11.

A speed-based proportional-integral (P-I) valve controller 37 receives the turbine speed target (bypass) from the set point calculator 27 and also receives the actual turbine speed, together with data indicating the actual positions of the turbine path valve 9a and the bypass path valve 9b. This controller 37 outputs a valve position control signal or signals. It conducts proportional-integral control, based on the actual turbine speed and the turbine speed target (bypass), to adjust the valve position control signal or signals for the valves 9a, 9b. During the periods when the turbine speed is controlled by the valve position control signal or signals output by the P-I current controller 37, the controller 37 will vary the valve position control signal or signals for the valves 9a, 9b so as to make the actual turbine speed match the turbine speed target (bypass). However, if the actual turbine speed continues to be less than the turbine speed target (bypass), the valve position control signal or signals will saturate at a value that fully closes the bypass path valve 9b and fully opens the turbine path valve 9a, sending all the exhaust gas to the turbine 3. Conversely, if the actual turbine speed is consistently above the turbine speed target (bypass), the output of the speed-based P-I valve controller 37 will saturate at a value which causes the bypass valve 9b to be fully open and the turbine valve 9a to be fully (or nearly) closed. In this state, the turbine 3 receives very little or even zero gas flow, and will inevitably slow down. This ability to slow the turbine 3 by removing most or all of the gas flow through it means that if the turbine speed begins to increase, the speed-based P-I valve controller 37 can always bring the turbine speed back down to the turbine speed target (bypass). For as long as the output from the speed-based P-I valve controller 37 is between its extreme values, it is effective to control the turbine speed by controlling the positions of the valves 9a, 9b, and in this case the speed of the turbine 3 is controlled by the bypass-based control loop.

Provided that the exhaust pressure is below the exhaust pressure limit and the turbine speed is below or is close to the turbine speed target (current), the speed-based P-I current controller 31 outputs a value which is below the maximum current limit whereas the exhaust pressure-based P-I current controller 33 outputs the value of the maximum current limit. Accordingly, the selector 35 selects the current demand value from the speed-based P-I current controller 31. In this case, the value of the current demand signal is controlled by the speed-based P-I current controller 31 so as to match the actual turbine speed with the turbine speed target (current). The output of the speed-based P-I valve controller 37 is saturated at the value that fully closes the bypass path valve 9b and fully opens the turbine path valve 9a, sending all the exhaust gas to the turbine 3, because the turbine speed remains below the turbine speed target (bypass). Accordingly, the speed of the turbine 3 is controlled by the current-based control loop. Under these circumstances, the control system acts to maximise the amount of electric current that is generated, and the amount of generated current is limited by the amount of energy available in the exhaust gas.

If the actual exhaust pressure exceeds the exhaust pressure limit, the current demand value output from the exhaust pressure-based P-I current controller 33 will begin to fall, and it will continue to fall for as long as the actual exhaust pressure exceeds the exhaust pressure limit. As a result, the current demand value output by the exhaust pressure-based P-I current controller 33 will rapidly become lower than the current demand value output by the speed-based P-I current controller 31. At this point, the selector 35 switches its selection, and outputs the current demand value from the exhaust pressure-based P-I current controller 33 as the current demand signal to the generator 11. The amount of current generated by the generator 11 is now controlled in response to the exhaust pressure.

Since the current demand input to the generator 11 is now lower than the current demand output from the speed-based P-I current controller 31, the generator 11 generates less current, and applies a lower torque to the turbine 3, than is required to keep the turbine speed at the turbine speed target (current). Consequently, the turbine speed will rise. The current demand output from the controller 31 will rise as the controller 31 attempts to reduce the turbine speed. However, the increased current demand from the controller 31 is ignored by the selector 35 because the selector 35 selects the lower of the two current demand values received by it. Therefore the attempts by the speed-based P-I current controller 31 to reduce the turbine speed are ineffective, and the current demand value output by the speed-based P-I current controller 31 rapidly saturates at the maximum current limit.

The increasing turbine speed will rapidly reach the turbine speed target (bypass), since this target is only slightly higher than the turbine speed target (current). Accordingly, the speed-based P-I valve controller 37 will begin to change its output valve control signal or signals to allow some exhaust gas to bypass the turbine 3, and the turbine speed will be held at the turbine speed target (bypass). Consequently, the speed of the turbine 3 is no longer controlled by varying the current output from the generator 11, the current-based control loop has ceased to be effective, and the bypass-based control loop has taken over. In this state the exhaust pressure-based P-I current controller 33 controls the current in the generator so that the exhaust pressure is at the exhaust pressure limit, and the speed-based P-I valve controller 37 holds the speed of the turbine 3 at the turbine speed target (bypass). Therefore the system as a whole is controlled to maximise the amount of electricity that is generated without exceeding the exhaust pressure limit.

The current-based control loop also ceases to be effective if the current demand value output from the speed-based P-I current controller 31 reaches the maximum current limit before the exhaust pressure reaches the exhaust pressure limit. In this case, even if the actual turbine speed increases above the turbine speed target (current), the current demand value output from the speed-based P-I current controller 31 cannot be increased further, and therefore the current demand signal sent by the selector 35 to the generator 11 does not increase. In this way, the current-based control loop ceases to control the speed of the turbine 3 when the current output from the generator 11 reaches the maximum current limit. As with the case discussed above, in which the exhaust pressure limit is reached, the turbine speed rapidly reaches the turbine speed target (bypass) and the speed-based P-I valve controller 37 becomes effective to control the turbine speed by adjusting the positions of the valves 9a, 9b. In this state, the control system acts to maximise the amount of electric current that is generated, without exceeding the maximum current limit.

Therefore it can be seen that the system as a whole acts to keep the turbine 3 rotating at close to a pre-selected target speed, and to maximise the amount of electric current that is generated without allowing the current to exceed the maximum current limit or allowing the exhaust pressure to exceed the exhaust pressure limit.

If the vehicle conditions change very suddenly, there is a possibility that the turbine 3 could accelerate very rapidly and might significantly exceed the turbine speed target (bypass) before the positions of the valves 9a, 9b can be adjusted to bring the speed back down. Since the turbine 3 can be damaged by excessive speed, the system of FIG. 5 includes an optional over-speed protection unit 39. This can be arranged to receive various inputs that enable it to identify the existence of a condition likely to lead to dangerous over-speed. For example, in FIG. 5 this is shown as receiving the maximum turbine speed limit from the set point calculator 27, the valve position control signal from the speed-based P-I valve controller 37, and the actual turbine speed. Accordingly, the over-speed protection unit can determine that there is a risk of over-speed if the turbine speed increases towards the maximum turbine speed limit, or if the turbine speed increases rapidly and the over-speed protection unit 39 detects a delay in the corresponding change in the valve position control signal required to bring the turbine speed back down.

Additionally, the set point calculator 27 may be configured to predict rapid changes in the load applied to the turbine 3, for example if information from the engine control unit 15 indicates a rapid increase in the mass gas flow in the exhaust path while information from the electrical systems 17 indicates a sudden reduction in current demand. This situation would indicate that the torque applied from the generator 11 to the turbine 3 is about to reduce just as the gas flow driving the turbine 3 is about to increase, from which it can be predicted that the turbine speed will increase rapidly. If it detects such a situation, the set point calculator 27 can output a "load transient" signal to the overspeed protection unit 39, indicating an imminent overspeed situation.

Whenever the overspeed protection unit 39 detects an actual or predicted overspeed situation, it sends a "brake torque demand" signal to the generator 11. This causes the generator 11 to apply a brief increase in torque to the turbine 3 in order to slow it down. The generator 11 can generate this extra braking torque either by increasing the output current beyond the level indicated by the current demand signal, or by changing the internal operation of the generator 11 so that it operates in a "lossy" mode in which, in effect, it generates excess currents internally which are not output from the generator 11. Both of these methods of generating extra torque to brake the turbine 3 are potentially damaging. If excess current is output from the generator 11 this will stress components in the electrical system 17 of the vehicle. If the generator 11 operates in its lossy mode the excess internal currents will be converted to heat within the generator 11. Accordingly, the additional braking torque, applied by the generator 11 to the turbine 3 in response to the brake torque demand signal from the overspeed protection unit 39, is applied only very briefly. It is not a suitable method of controlling the speed of the turbine 3 and is used only to prevent damage to the turbine 3 in the brief interval before the bypass-based control loop, using the speed-based P-I valve controller 37 and the valves 9a, 9b, becomes effective to limit the turbine speed.

When the system of the present embodiment is not required to generate any electrical current, the current demand signal to the generator 11 is set to zero. For example, the set point calculator 27 can set the maximum current limit to zero. Accordingly, control of the turbine speed passes to the bypass-based control loop. Since no electricity needs to be generated, there is no need for the turbine 3 to rotate at its normal operation speed, and the turbine speed target (bypass) is reduced to an idle value. Accordingly, the bypass-based control loop will adjust the positions of the turbine path valve 9a and the bypass path 9b so that most of the exhaust gas flow is through the bypass path 5b and just a small flow continues along the turbine path 5a to turn the turbine 3 at the idle speed. It is preferred to keep the turbine 3 rotating at an idle speed rather than to stop it entirely, because this makes it easier to accelerate the turbine 3 again when current generation is required.

In this embodiment, the bypass-based control system ensures that the turbine speed 3 does not increase excessively even if the maximum permitted current output is reached. The exhaust pressure-based control system ensures that the back-pressure, applied by the turbine 3 to upstream components in the exhaust flow such as any turbocharger 7 and the engine 1, is not excessive. The system for controlling the output current in response to turbine speed ensures that the generator generates the maximum amount of electric current possible under the prevailing conditions.

The present embodiment is provided merely as an example, and many variations are possible. For example, the set point controller 27 of FIG. 5 and the control system 13 of FIG. 1 receive information about the temperature and pressure in the exhaust path 5, and accordingly FIG. 1 shows a temperature sensor 41 and a pressure sensor 43. However, it is sometimes impractical to fit these sensors to the exhaust system of a vehicle. Accordingly, it is possible instead to use estimated values for the exhaust pressure and/or exhaust temperature, calculated from other values in the system such as the mass airflow through the engine 1, the engine speed and load and the ambient pressure, together with other factors affecting the gas flow through the exhaust such as the turbine speed, the power output from the generator 11 and the positions of the valves 9a, 9b.

Figure 6:
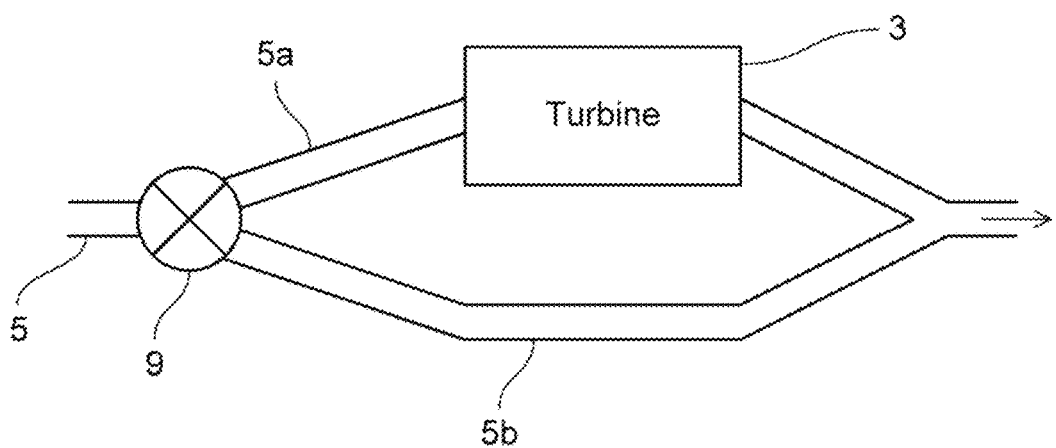
FIG. 6 shows a modified bypass arrangement.

Additionally, the present embodiment shows separate valves 9a and 9b for the turbine path 5a and the bypass path 5b. However, these could be replaced by an integrated flow diverter 9, as shown in FIG. 6. The flow diversion valve 9 adjusts the relative proportions of the exhaust gas flow that enter the turbine path 5a and the bypass path 5b. Because it is a single flow diversion valve rather than two separate cut off valves, there is less possibility of an error situation in which flow is blocked simultaneously in both paths.

In the preceding discussion, the engine 1 is installed in a land vehicle, e.g. as the main drive engine. However, embodiments of the present invention may be used in different types of vehicle, and also in non-vehicle apparatus such as an electrical generator set.

Even if the main power output from the engine 1 is used to generate electricity (as in an electrical generator set), the electrical system for the engine's control electronics and other equipment in the apparatus (such as the starter motor) may be powered by electricity generated separately from the main generator driven by the engine 1. Partly this is because the main generator will typically be used to generate electricity with different characteristics from the electricity used in the internal electrical system of the apparatus (e.g. 110V or 230V ac at 60 Hz or 50 Hz, compared with e.g. 12V dc), and partly because it allows the apparatus to be self-contained and for its internal electrical system to operate (and its battery to be recharged) even while there is no electrical demand on the main generator. The electric current output by the generator 11, driven by the turbine 3 in the exhaust path 5, is normally supplied to the internal electrical system of the apparatus, and so it is possible that the electric current that can be accepted from the generator 11 is limited even though the engine 1 is being used to drive a separate electric generator. Even if the electric current from the generator 11 is used to supplement the output from the main generator driven by the engine 1 (e.g. in the case that the main generator is being used to generate a low voltage dc supply), it is possible that the electric current that can be accepted from the generator 11 is limited, for example if the load on the main generator is reduced to zero.

The following annex discusses design issues for an example of a system based on the present embodiment.

ANNEX

This annex describes the design and development steps taken to research a workable turbo-generator integrated gas energy recovery system.

The main areas covered focus on simulation, machine design, control system development and validation. The mechanical design for this system is particularly challenging for a number of reasons. The turbine is capable of rotating the shaft at speeds greater than its critical rotating limit. Rolling element grease filled bearings are used to allow application flexibility; these have an operating temperature limit of 200° C. The exhaust gas can reach temperatures greater than 900° C. in spark ignition applications, whereas the turbine upper functional limit is 850° C. The power electronics are integrally mounted in the machine have a maximum thermal operating limit of 120° C.

Considering that the system is expected to harvest energy from the exhaust gas it is important not only that it survives in this harsh environment but also it should produce work with no adverse impact on vehicle performance or fuel efficiency. The system device and its control system have been designed to do this through a number of thorough modelling exercises.

1. Introduction

The efficiency of a conventional internal combustion engine is nominally between 25 and 35 percent in optimal conditions of use. This means that up to 75% of vehicle fuel combustion energy is lost through waste heat. In order to meet increasingly arduous vehicular $CO_2$ emission targets, various 'more-electric' technologies are emerging, resulting in an increase in the peak vehicle electrical load. An attractive solution to meeting this electrical power requirement is to generate electrical energy from the exhaust gas by means of a turbo-generator system.

The concept of direct turbo generation uses a gas flow turbine coupled to an electrical generator in order to extract work from the potential and kinetic energy of the exhaust gas flow. This differs from other waste-heat recovery devices as they rely solely on heat transfer mechanisms to a raise the enthalpy of a separate working fluid to then extract work from.

$$\dot{W} = \dot{m} C_p (T_1 - T_2) \qquad [1]$$

$$\eta_T = \frac{T_1 - T_2}{T_1 - T_{2s}} \qquad [2]$$

$$T_{2s} = T_1 \left[ \left( \frac{p_2}{p_1} \right)^{\frac{\gamma-1}{\gamma}} \right] \qquad [3]$$

By combining equations [1], [2] and [3], turbine shaft power ($\dot{W}$) can be expressed as function of mass flow, turbine inlet temperature and pressure ratio:

$$\dot{W} = \eta_T \dot{m} C_p T_1 \left[ \left( \frac{p_2}{p_1} \right)^{\frac{\gamma-1}{\gamma}} \right] - 1 \right) \quad [4]$$

Using equation [4] it is observed that besides turbine efficiency ($\eta_T$), the key variables required to produce shaft work from a turbo-generator are exhaust gas mass flow ($\dot{m}$), turbine inlet temperature ($T_1$) and turbine inlet pressure ($P_1$). Therefore, with a correctly specified turbine, there is the potential to harvest a significant amount of electrical energy over a large proportion of the engine operating range as the turbo-generator can directly take advantage of both temperature and mass flow rate of the exhaust gas provided by the engine.

It is also evident that any power generated from the device must induce a level of back-pressure to the engine. Exhaust back-pressure typically increases the engine's brake specific fuel consumption, (BSFC, measured e.g. in g/kW·h). However, by efficiently characterising a turbine and generator at the correct operating points, it is possible to generate a greater electrical power than the power lost at the crank shaft of the engine due to the applied back-pressure.

2. Simulation
2.1 Drive Cycle Analysis

Figure 7:
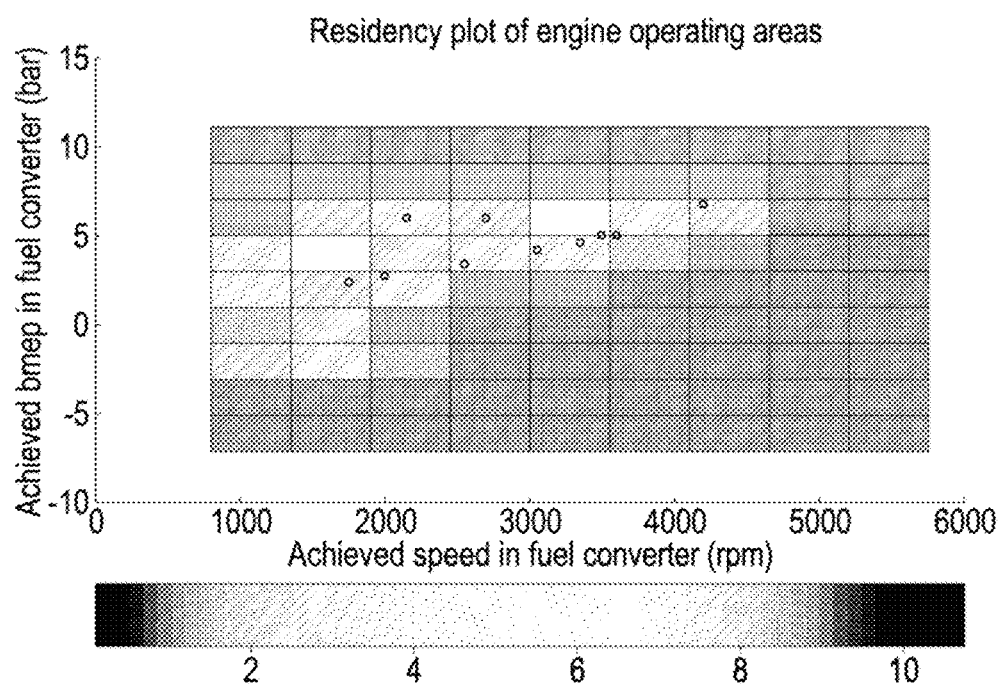
FIG. 7 shows is a residency plot of engine speed and engine brake mean effective pressure (BMEP).

The initial requirements gathering for a target application begins by using 1-D engine simulation tools such as Ricardo Wave or GT-Power. The vehicle was analysed over various specified drive cycles to identify the operating conditions of the engine that should be the focus for the design point and characterisation of the turbo-generator integrated gas energy recovery system. This is shown in FIG. 7, which is a typical residency plot of engine speed in rpm and engine brake mean effective pressure (BMEP) in bar.

2.2 Turbine Characterisation

In order to maximise net efficiency across the drive cycle the mean point in the engine speed and load plot was taken as the primary design point. At this design point; values of exhaust mass flow, exhaust gas temperature and exhaust pressure can be determined.

By then simulating a variable throttle in the exhaust with the engine running at the specified design point, a relationship between exhaust back-pressure (kPa) and engine pumping losses (kW) can be identified. Subsequently, using equation [4] in Section 1 above, and by assuming typical peak values of turbine and electrical generator efficiency, a relationship between the engine's pumping losses (kW) and the turbo-generator system's electrical generation (kW) can be estimated across the range of turbine pressure ratios.

Figure 8:
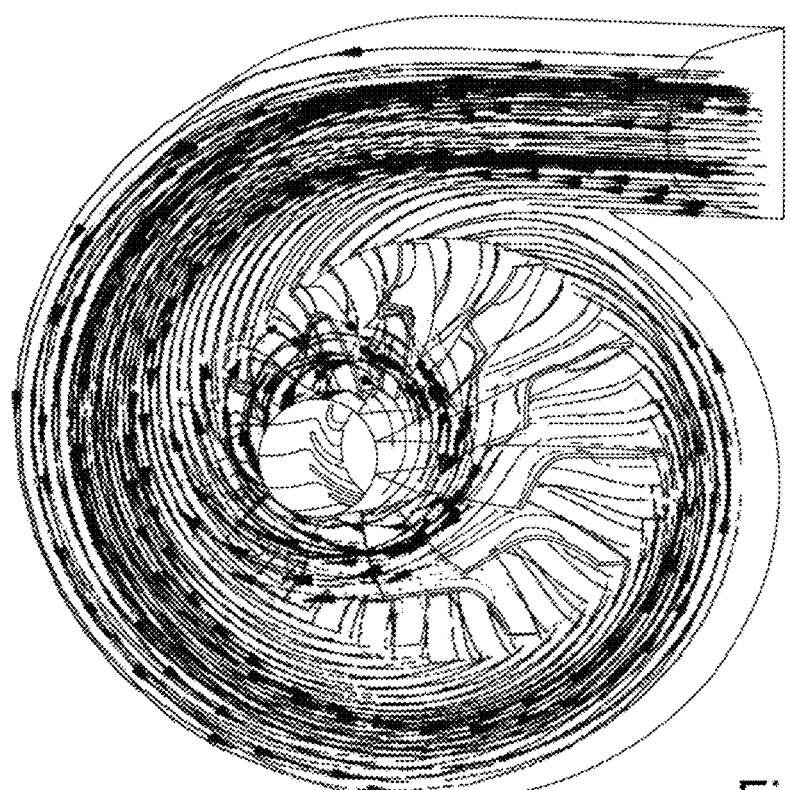
FIG. 8 shows a turbine flow analysis for a turbine in a detailed design proposal.

For the core proof-of-concept turbo-generator system, a design point of 50,000 rpm with a pressure ratio of 1.14 was identified. From this design point, a full turbine design was developed using ANSYS-CFX. Radial element blades have been specified in order to avoid stresses due to blade bending. Both blade-only and full stage analyses were performed. FIG. 8 shows a turbine flow analysis, with velocity streamlines, using ANSYS.

Figure 9:
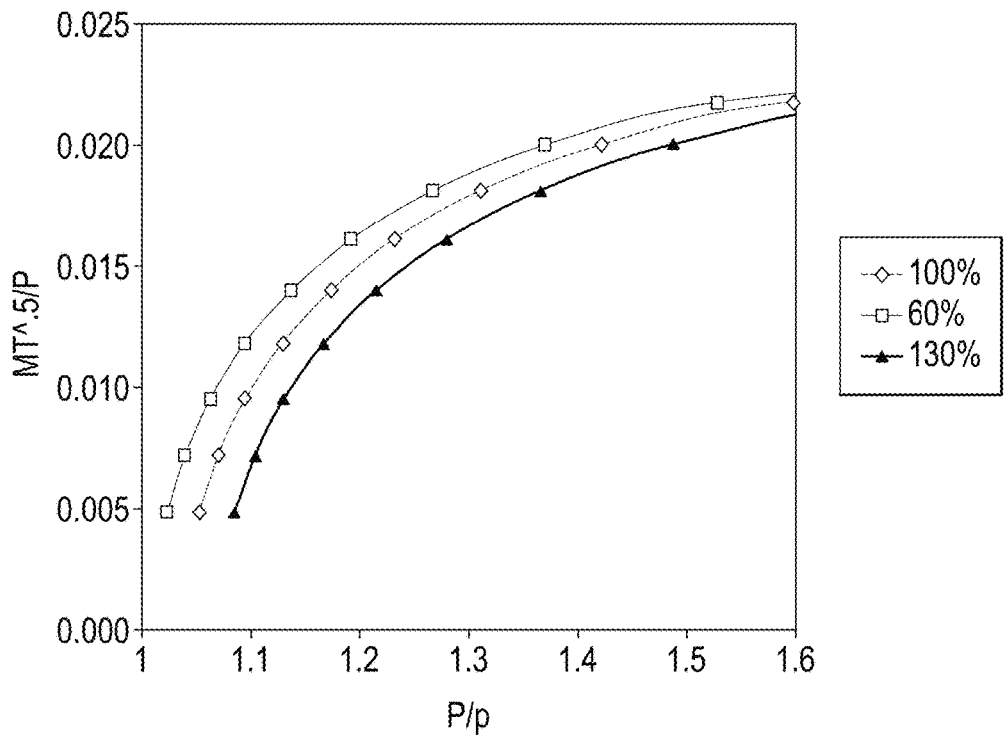
FIG. 9 shows a graph of mass flow parameter against pressure ratio for a turbine in a detailed design proposal.

A full off-design prediction over a large speed range was subsequently carried out using the mean-line method for the turbine, with the results illustrated in FIGS. 9 and 10. FIG. 9 shows a turbine characterisation with graphs of mass flow parameter (MFP)

$$\left( \frac{kg}{s} \cdot \frac{\sqrt{K}}{kPa} \right)$$

against pressure ratio for 60%, 100% and 130% of design speed. FIG. 10 shows graphs of total-to-static efficiency against pressure ratio for the same three percentage design speeds.

2.3 Generator Characterisation

The switched reluctance (SR) generator provides many benefits over conventional permanent magnet generators. Due to the absence of rotor windings, switched reluctance machines possess low rotating inertias thus minimising rotor losses. In addition, due to the exclusion of permanent magnets there is no risk of torque loss due to de-magnetisation or uncontrolled generating modes at high-speed. The SR type generator also facilitates cost savings across the design, including minimal tooling investment due to the straight-forward motor construction and a reduction in the rating of the power electronics due to low switching frequencies.

Figure 11:
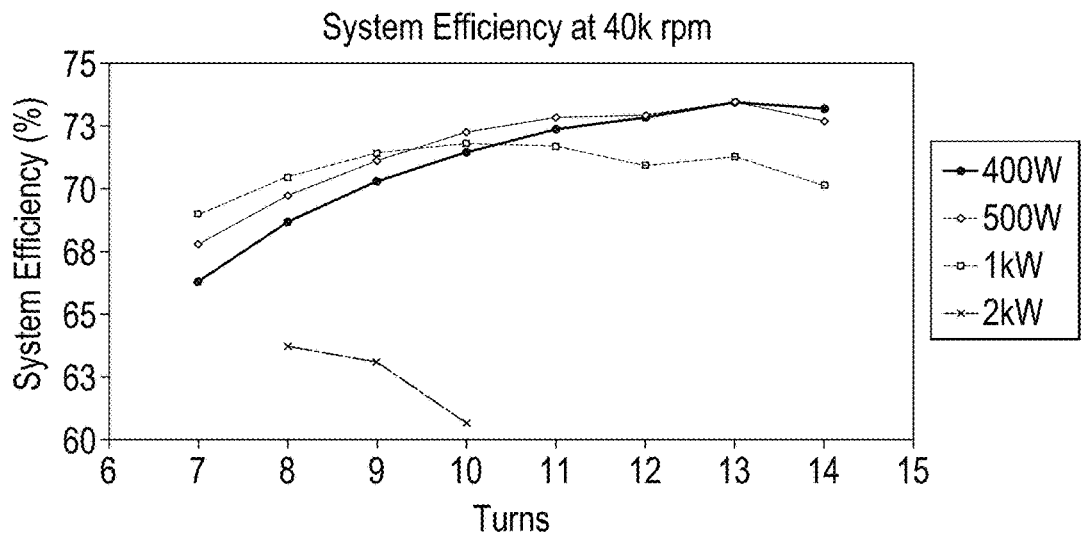
FIG. 11 shows graphs of efficiency at 40,000 rpm for different winding configurations for a switched reluctance generator in a detailed design proposal.
Figure 12:
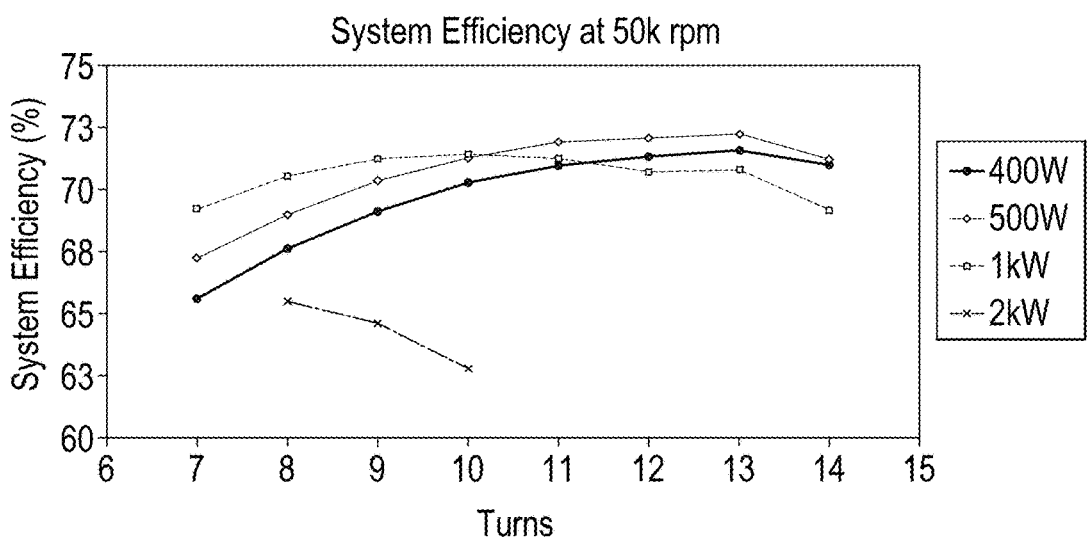
FIG. 12 shows similar graphs to FIG. 11, for the generator 50,000 rpm.

The configuration of switched reluctance motor (generator) chosen for the core proof-of-concept machine is of a 6/4 design, denoting that the stator consists of six poles and the rotor of four. The stator is wound with an insulated copper wire, which gives the generators peak efficiency at 1 kW at 40,000 rpm (FIG. 5). Although the peak efficiency of the generator core occurs at 40,000 rpm due to the inherent nature of SR machine the efficiency is very consistent over the range of operating speeds (20,000 to 60,000 rpm). This allows the turbine efficiency to be the main parameter determining the operating speed of the turbo-generator. FIG. 11 shows graphs characterising motor (generator) efficiency at 40,000 rpm for different winding configurations. FIG. 12 shows similar graphs characterising motor (generator) efficiency at 50,000 rpm.

Figure 10:
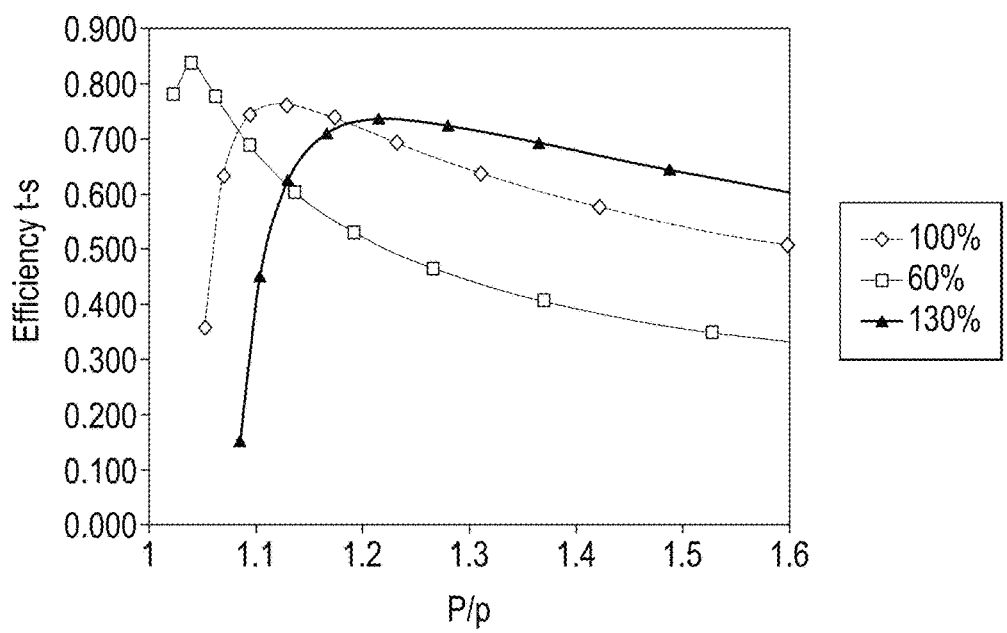
FIG. 10 shows a graph of total to static efficiency against pressure ratio for a turbine in a detailed design proposal.

By combining the final turbine characterisation (as shown in FIGS. 9 and 10) and the full generator characterisation, full drive cycle simulations with the turbo-generator unit can be realised to identify net gains.

3. Machine Design
3.1 Heat Transfer Challenges

The 'hot' side components consist of the turbine, the volute and a separate turbine back-plate, which are in direct contact with the exhaust gas that can reach temperatures of up to 900° C. The main considerations for the design of these components, therefore, are the correct material selection, adequate sealing and accurate control of their assembly. The potential stack-up of manufacturing tolerances was monitored to ensure that the fine clearances of the high speed components were maintained, and in order to improve the efficiency of the turbine.

In order to maximise turbine efficiency across the range, the clearances from the outer edges of the turbine blade and the inner surface of the volute must be kept constant. Therefore the thermal expansion of turbine and turbine housing material must be similar.

A number of bearing technologies were evaluated including: rolling element; hydrodynamic floating bush; foil gas; magnetic and spiral groove air. The selected bearings are angular contact, sealed-for-life, grease-filled bearings; providing the key advantage of their simplicity in that they do not require an external oil supply, internal oil feeds or sealing. However, in the high temperature environment, the bearings will operate close to their limits. The thermal limitation of these bearings is governed by the grease and the cage holding the rolling elements, which cannot exceed 200° C.

Various features have been incorporated into the design of the shaft in order to reduce heat transfer from the turbine into the front bearing. The motor section of the shaft is made from steel to maximise compatibility with the rotor poles. However, calculations verified that steel provided a thermal conductivity unsuitable for the turbine and front bearing section of the shaft. Therefore the hot end of the shaft was manufactured from a nickel based material with high temperature capability, a thermal expansion compatible with the turbine material and a far lower heat transfer coefficient than the steel. In addition, the shaft incorporates a piston ring feature designed to provide a heat transfer path from the shaft into the housing. This design facilitates operation of the turbo-generator with exhaust gas temperatures up to 200° C. higher than without the ring.

To ensure that the bearing system, the generator core and the integrated electronics are all kept within their working ranges, a coolant flow within the unit was required. The coolant system has been design to accept coolant flow from the engine's coolant system, operating between 80° C. and 105° C., with a flow rate of up to 6 l/min and a minimal pressure drop.

Figure 13:
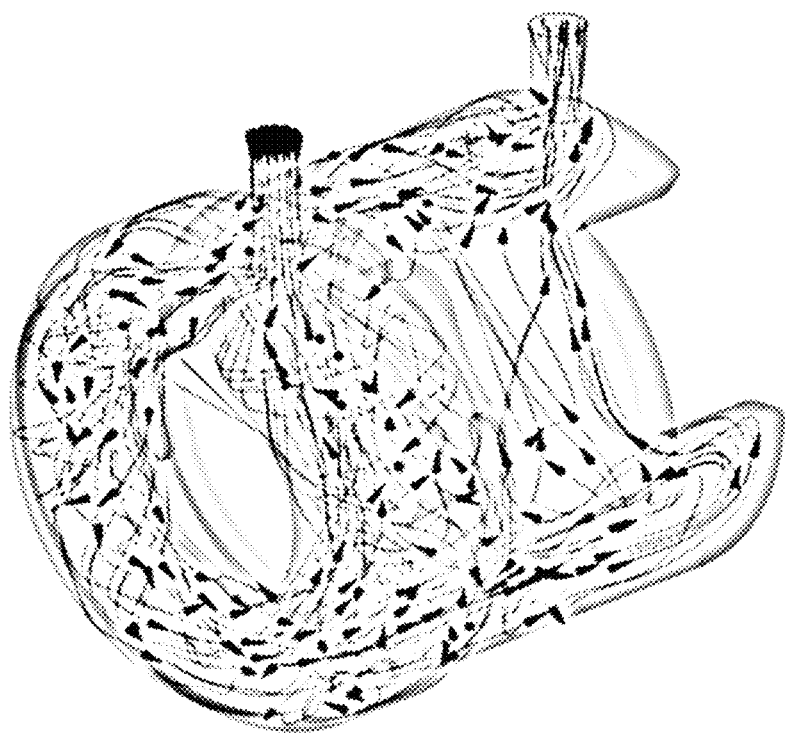
FIG. 13 shows coolant flow lines in a coolant jacket for a turbine in a detailed design proposal.
Figure 14:
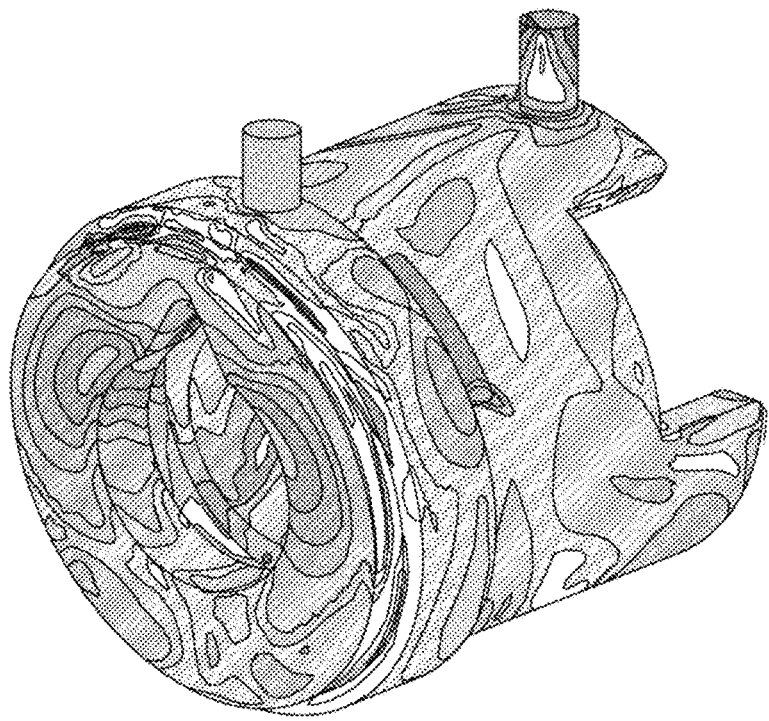
FIG. 14 shows a pattern of heat transfer co-efficient in the coolant jacket for a turbine in a detailed design proposal.

A simplified axisymmetric finite element model of the machine geometry was developed using ANSYS CFD (Computational Fluid Dynamics) software. Boundary conditions for the cooling system and turbine were then calculated (temperature and heat transfer coefficients) and these boundary conditions applied to the model. The model was then run in a steady state condition, with 85° C. coolant inlet temperature at 6l/min flow rate to evaluate flow patterns, heat transfer and pressure drop throughout the coolant circuit. This aided the identification of any low flow or low heat transfer regions within the system and allowed detailed design changes to be implemented in order to optimise the overall performance. Cooling system performance has subsequently been verified by experimental running. FIG. 13 shows coolant flow patterns with velocity streamlines from the coolant jacket ANSYS CFD study. FIG. 14 shows the heat transfer co-efficient from the coolant jacket ANSYS CFD study.

3.2 Critical Speed

Figure 15:
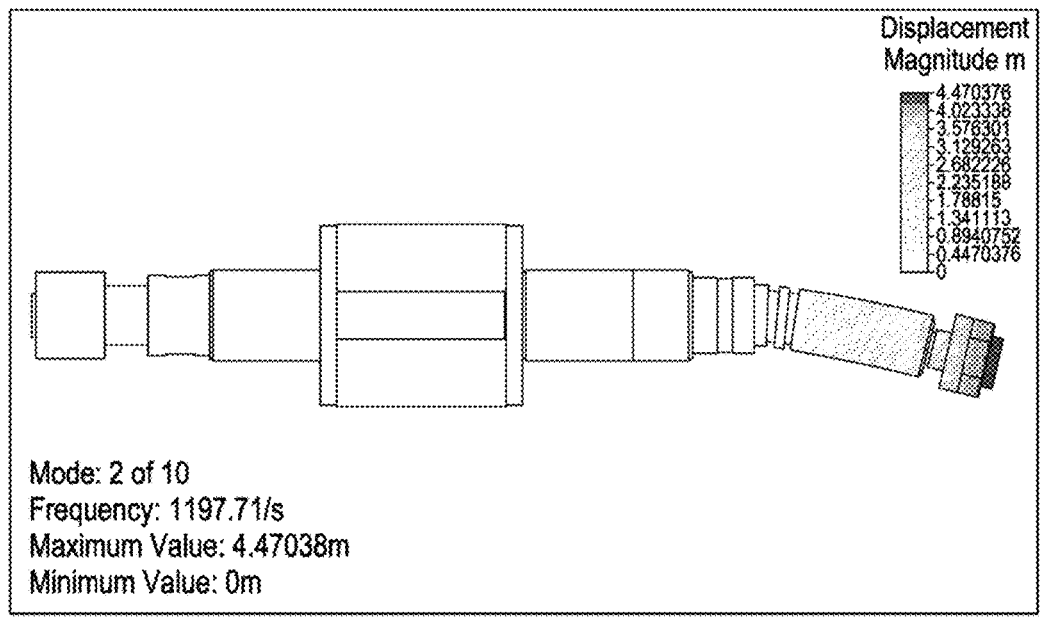
FIG. 15 shows study of the critical speed for a shaft in a detailed design proposal.

In order to ensure reliable operation at high shaft speeds, a study was undertaken to ensure that the design operating speed was below the first natural resonance of the rotating assembly. The first two critical speeds of the shaft, rotor and radial turbine were calculated using a three dimensional ALGOR CAE model. This incorporated the appropriate material property data for the two piece shaft assembly and permitted design iterations in critical areas such as the length of shaft overhang and axial position of the front bearing to be evaluated. FIG. 15 shows a critical speed study for the shaft. The optimised design resulted in a first critical speed of approximately 72,000 rpm, which was significantly higher than the design operating speed of 50,000 rpm.

3.3 Integrated Power & Control Electronics

The turbo-generator integrated gas energy recovery system design also features integrated power and control electronics at the rear of the motor. This enables easier packaging and installation into a vehicle, a reduction in copper losses due to a minimal distance between the generator core and the power electronics and also facilitates active cooling of the power board via the internal cooling jacket.

The advent of suitable power electronics to control switched reluctance (SR) machines has moved with considerable pace; in particular the rate of change in performance of MOSFETs (Metal Oxide Semiconductor Field Effect Transistors) has been vast. One characteristic is the reduction in $R_{dson}$ (On Resistance) whereby the benefit improves machine efficiency and reduces the overhead of heat management.

These advantages can be harnessed by using the latest technologies, coupled with advanced heavy copper (6 oz-210 μm) PCBs (printed circuit boards) to produce a compact solution. Manufactured using industry standard methods and equipment, the design is set to reduce start-up time and capital investment for production.

By using high performance, automotive qualified, discrete components which can be multi sourced, a flexible, customised approached to customer requirements can be achieved. The use of discrete components, allied to the inherent flexibility of industry standard PCB design, allows both a scalar approach to customer production ramp-up and the cost effective solution of supplying product to suit various voltage architectures 3.4 By-Pass As the turbo-generator device does not have a mechanical restriction on its turbine speed, such as a compressor on a conventional turbocharger, the device should be operated with a comprehensive bypass system.

The bypass system is required for both safety and performance control. With reference to section 3.2, if the turbine is accelerated past its critical speed, then irreparable damage to the turbine shaft would be sustained. It is therefore important that even at the peak power output of the engine, the system is able to enter a fail-safe (zero power) mode that ensures the turbine does not rotate beyond a safe speed.

Figure 16:
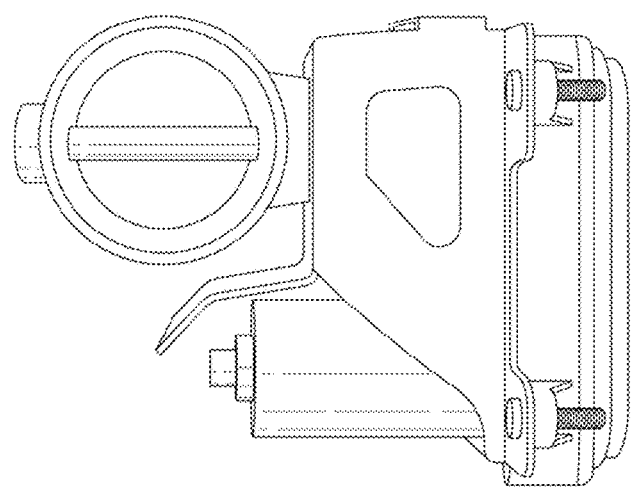
FIG. 16 shows an exhaust valve for a detailed design proposal.
Figure 17:
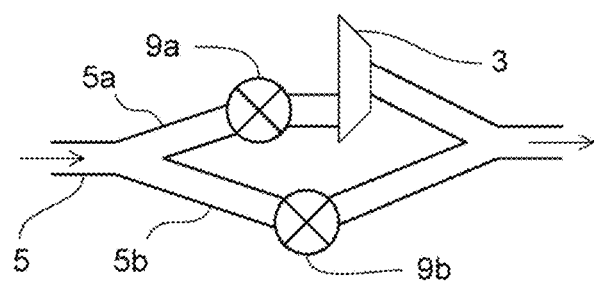
FIG. 17 shows schematically the design of the bypass arrangement for the turbine in a detailed design proposal.

For development, two electrically controlled and actuated exhaust valves, were used. This enabled the position of the valves to be controlled independently and accurately via a signal output from the system control board. FIG. 16 shows an example of a valve, and FIG. 17 is a schematic of the bypass gas flow arrangement.

A system configuration study was performed in order to determine the correct specification of response time for the valve actuators. The study investigated the effect of maximum transience given by the engine on the turbo-generator system's rotating assembly at a speed of 50,000 rpm. The conclusion specified that a valve with a $T_{90}$ (time taken to reach 90% of its target position) of less than 116 ms would prevent the turbine from reaching its critical speed before shutdown.

Another important parameter to consider was internal valve leakage. With the engine operating at peak power output and with the turbo-generator system set to a dormant state (i.e. no electrical loading on the motor), the valve should only allow enough exhaust gas into the turbo-generator system to rotate the turbine at a maximum of 20,000 rpm. Conversely, when the turbo-generator system is required to perform maximum generation for a given set of engine conditions any leakage through the bypass valve will have the same effect as a reduction in the turbine efficiency. As the turbo-generator system increases the power output for a fixed speed, the upstream pressure will rise giving a leakage rate not only as a function of mass flow but also of temperature and pressure ratio as well. This issue is compounded by the requirement to operate in a wide range of exhaust gas temperatures.

4. Control System Development

The exhaust of a conventional road vehicle is a highly transient environment with regard to mass flow and temperature. Because of this high level of transience, a group of sophisticated software algorithms have been designed to control the bypass system and the current generated by the turbo-generator system, in order to safely provide the vehicle with useful electrical power and at the highest possible system efficiency.

4.1 Speed Control

As discussed in Section 3.4, the control of the turbine speed is important for the unit's performance and longevity. The turbine speed can be controlled by two different methods. Primarily the turbine speed can be managed by the torque applied on the rotor from the electrical generator, such that to maintain a constant motor (generator) speed from an increase of torque from the turbine, an equal increase in torque from the generator can be applied. The effect of this would be an increased electrical power output from the turbo-generator system. This order of control is not always appropriate to use as the vehicle's electrical system may not be able to accept an increase of current from the generator. In this case the speed can be managed by the two exhaust valves diverting a proportion of the gas flow from the turbine, and thus reducing the torque applied to the shaft.

4.2 Current Control

By providing an input signal of current demand and by measuring output current on the power board, the vehicle's electronic control unit (ECU) or battery management system (BMS) can specify a limiting value of current in order to avoid supplying unnecessary power to the electrical system.

4.3 Voltage Control

For a typical 12V 'nominal' system, the turbo-generator system device is capable of operating between 9V and 16V, though efficiency would be compromised running towards the extremities of this voltage range. In addition to the measurement of current, the turbo-generator system also measures bus voltage on its power board. Although the device is designed to be a current generating device and does not provide a system voltage, the generator's control does however incorporate a strategy whereby the current output is modulated by the control described in Section 4.2 to maintain the system voltage set-point.

4.4 Back Pressure Control

For a fixed turbine speed, increasing or decreasing the electrical power extracted by the turbine respectively increases or decreases the exhaust system pressure upstream of the turbo-generator system, i.e. the backpressure to the engine.

As exhaust pressure is critical to overall vehicle performance and economy, the turbo-generator system upstream pressure should be accurately monitored and controlled. By determining the critical limits of back-pressure it can be ensured that the system operates only when the turbo-generator system provides a positive energy balance to the vehicle.

4.5 Thermal De-Rate

In addition to the external demands placed on the turbo-generator system it is also necessary to protect by means of electrical output de-rate whilst close to internal limits.

4.6 Shutdown Mode (Fail-Safe Mode)

The system incorporates a safety shutdown mode where both the valve actuator and generating current demands are set to safe values. As discussed in Section 3.4, this mode would set the turbine valve to fully closed and set the bypass valve to fully open in order to prevent the turbine from rotating above a safe limit, and the current output demand is set to zero.

5. Preliminary Validation

To demonstrate accuracy and response in the control of turbine speed, a test was performed demanding a 5,000 rpm change in speed set-point. The turbine speed was set to be below the minimum generating speed so that it was solely controlled by the position of the exhaust valves and the only reacting torque was due to its inertia and aerodynamic losses. The results are shown in FIG. 18.

Figure 18:
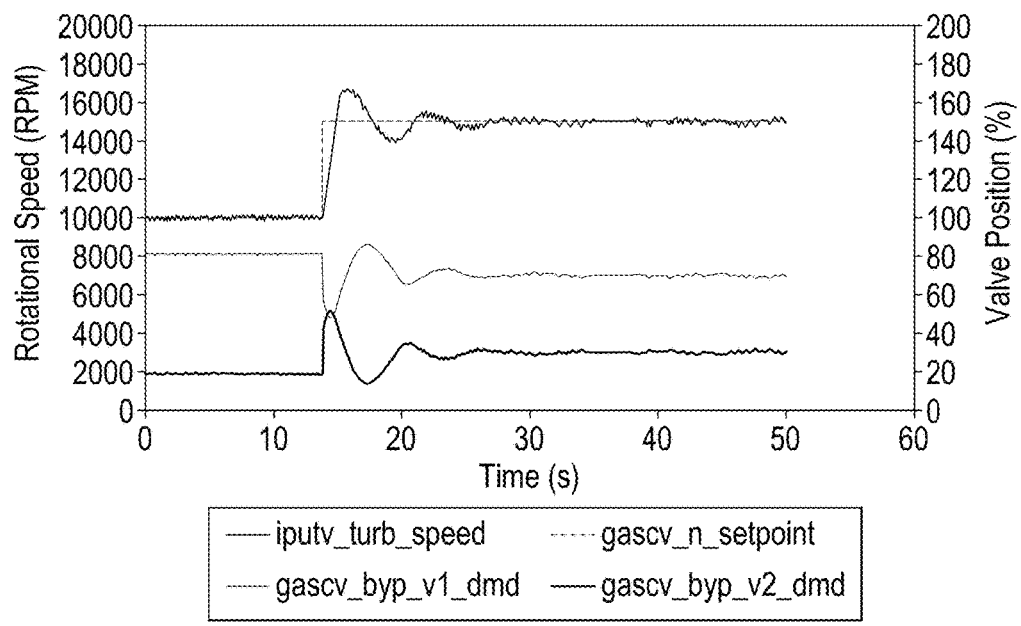
FIG. 18 shows graphically the results of a test of the response of the detailed design proposal to a change in the turbine speed set-point.

FIG. 18 shows that with a stepped input of speed demand, the valves react to control to the new speed set-point. From a performance perspective the proportional and integral gains in the controller have scope to be optimised as the overall settling time is approximately 5 seconds. However, from a safety perspective the valves react with a satisfactory initial response and velocity to protect the turbo-generator system.

Figure 19:
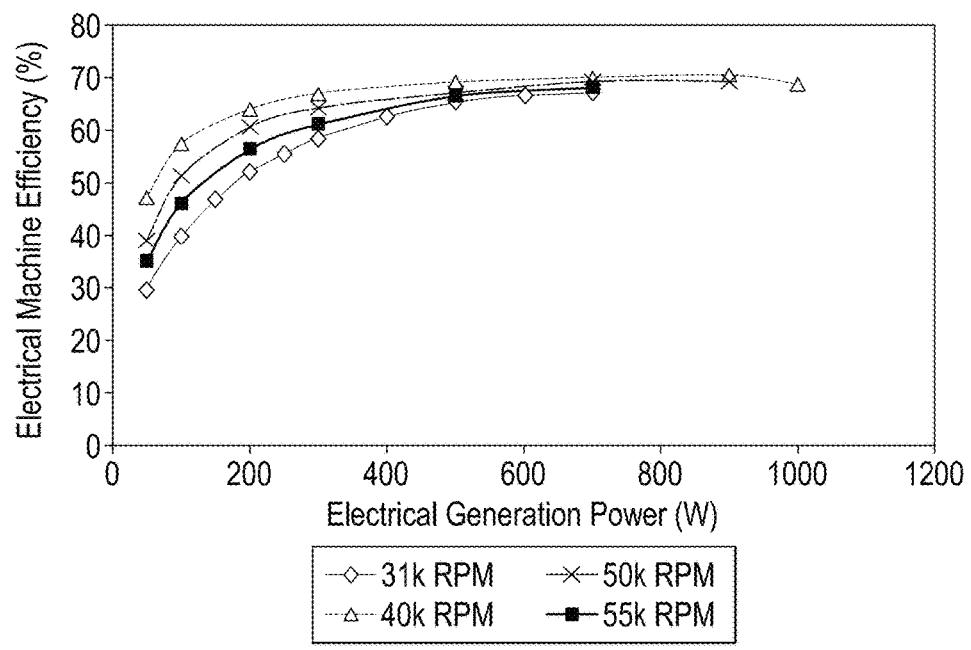
FIG. 19 shows graphically the results of a test of the efficiency of the generator of the detailed design proposal at 85° C.

In order to validate the generator characteristics, the turbine and turbine housing were removed and the device was fixed to a high speed shaft-to-shaft torque dynamometer. FIG. 19 shows the generator electrical efficiencies at 85° C. coolant.

The results in FIG. 19 show that the predictions made in the charactisation were correct in that 40,000 rpm is the generator's most efficient speed. The characterisation specified that the generator would achieve a system efficiency of above 70% and when aerodynamic and bearing losses are taken into account this shows a very good correlation to the predictions.

Figure 20:
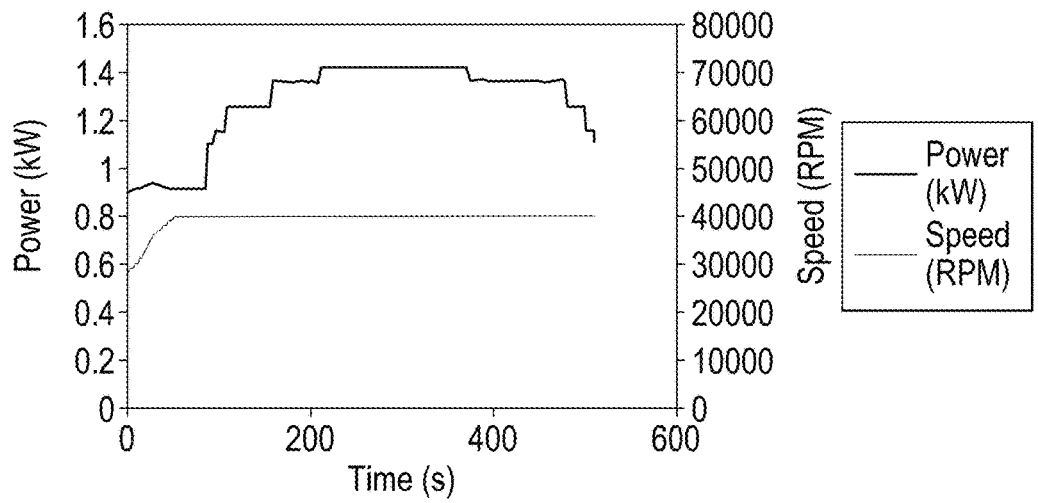
FIG. 20 shows the electrical output achieved during a test of the detailed design proposal.

To demonstrate steady state generating capability, the turbo-generator system was fitted to the exhaust of an engine-dynamometer with the bypass valve forced closed. The turbine speed was then fixed at 40,000 rpm and the engine speed was progressively increased to determine a steady-state operating point remaining below all of the machines thermal limits. FIG. 20 shows the electrical output during this test. During this test a peak continuous generating power of over 1.4 kW was achieved.

Figure 21:
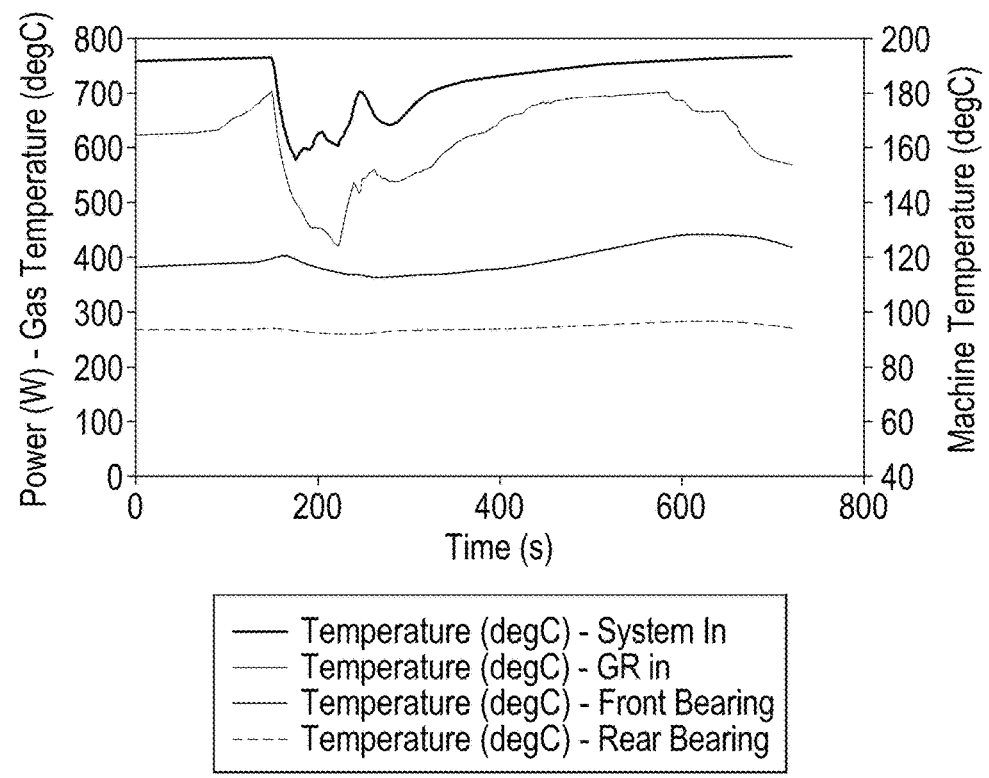
FIG. 21 shows the temperatures reached during a test of the detailed design proposal.

In order to validate the thermal capabilities of the bearing system, the turbo-generator unit was tested on a spark ignition engine dynamometer set to a steady-state condition that would provide a manifold temperature of approximately 800° C. The limiting factor for the test was to be the inner race of the front bearing temperature; although only the static outer race could be measured. Therefore the limit was set to 130° C. based on calculation of heat transfer through the bearing. FIG. 21 shows the temperatures reached.

From FIG. 21 it can be seen that the inlet temperature to the turbine reached 700° C. and the outer race of the front bearing stayed below its specified limit of 130° C.

The invention claimed is:

1. A method for generating electricity from an exhaust gas flow from an internal combustion engine of a vehicle, comprising;
 using the exhaust gas to drive a turbine;
 using the turbine to drive a generator;
 controlling a torque applied by the generator to the turbine so as to maintain the turbine at a constant speed;
 and, when the vehicle's electrical system cannot accept an increase in current from the generator, controlling the turbine speed by diverting a proportion of the exhaust gas flow to bypass the turbine.

2. A system for generating electricity from an exhaust gas flow from an internal combustion engine of a vehicle, comprising:
 a turbine arranged to be driven by the exhaust gas;
 a generator arranged to be driven by the turbine; and
 a control system for controlling a torque applied by the generator to the turbine so as to maintain the turbine at a constant speed,
 wherein the control system is configured to control the turbine speed, when the vehicle's electrical system cannot accept an increase in current from the generator, by diverting a proportion of the exhaust gas flow to bypass the turbine.

3. A method of controlling a system for generating electricity from an exhaust gas flow from an internal combustion engine, wherein the system comprises: a turbine to be driven by the exhaust gas flow; an electricity generator to be driven by the turbine; and a bypass path that enables exhaust gas flow from the engine to bypass the turbine, wherein the method comprises:

adjusting an electric current output from the generator in response to a speed of rotation of the turbine so as to seek to maintain the speed of rotation of the turbine at or below a first set speed, provided that the electric current output of the generator does not exceed a current limit;

and at least when the electric current output of the generator reaches or exceeds the current limit, adjusting the relative proportions of (a) exhaust gas flow through the turbine and (b) exhaust gas flow through the bypass path, in response to the speed of rotation of the turbine so as to seek to maintain the speed of rotation of the turbine at or below a second set speed, the second set speed being higher than the first set speed.

4. The method according to claim 3 in which the electric current output from the generator, or the said current limit, is reduced if the actual or predicted pressure of the exhaust gas at a position upstream of the turbine and upstream of the bypass path exceeds a pressure limit.

5. The method according to claim 3 in which the electric current output by the generator is adjusted in response to the speed of rotation of the turbine so as to seek to maintain the speed of rotation of the turbine at the first set speed, provided that the electric current output of the generator does not exceed the current limit.

6. A system for generating electricity from an exhaust gas flow from an internal combustion engine, comprising:

a turbine to be driven by the exhaust gas flow;
an electricity generator to be driven by the turbine;
a bypass path that enables exhaust gas flow from the engine to bypass the turbine; and
a control system configured to adjust an electric current output from the generator in response to a speed of rotation of the turbine so as to seek to maintain the speed of rotation of the turbine at or below a first set speed, provided that the electric current output of the generator does not exceed a current limit;
wherein the control system is configured to adjust the relative proportions of (a) exhaust gas flow through the turbine and (b) exhaust gas flow through the bypass path, in response to the speed of rotation of the turbine so as to seek to maintain the speed of rotation of the turbine at or below a second set speed, at least in the case that the electric current output of the generator reaches or exceeds the current limit,
the second set speed being higher than the first set speed.

7. The system according to claim 6 which is arranged to reduce the electric current output from the generator, or the said current limit, if the actual or predicted pressure of the exhaust gas at a position upstream of the turbine and upstream of the bypass path exceeds a pressure limit.

8. The system according to claim 6 which is arranged to adjust the electric current output by the generator in response to the speed of rotation of the turbine so as to seek to maintain the speed of rotation of the turbine at the first set speed, provided that the electric current output of the generator does not exceed the current limit.

9. A method of controlling a system for generating electricity from an exhaust gas flow from an internal combustion engine, wherein the system comprises: a turbine to be driven by the exhaust gas flow; an electricity generator to be driven by the turbine; and a bypass path that enables exhaust gas flow from the engine to bypass the turbine, wherein the method comprises:
adjusting relative proportions of (a) exhaust gas flow through the turbine and (b) exhaust gas flow through the bypass path, in response to a speed of rotation of the turbine; and
adjusting the electric current output from the generator in response to the actual or predicted pressure of the exhaust gas at a position upstream of the turbine and the bypass path.

10. The method according to claim 9 in which the electric current output by the generator is adjusted in response to the speed of rotation of the turbine so as to seek to maintain the speed of rotation of the turbine at or below a first set speed, provided that the electric current output of the generator does not exceed a current limit.

11. The method according to claim 10 in which the relative proportions of (a) exhaust gas flow through the turbine and (b) exhaust gas flow through the bypass path, are adjusted in response to the speed of rotation of the turbine so as to seek to maintain the speed of rotation of the turbine at or below a second set speed, the second set speed being faster than the first set speed.

12. The method according to claim 10 in which the electric current output by the generator is adjusted in response to the speed of rotation of the turbine so as to seek to maintain the speed of rotation of the turbine at the first set speed, provided that the electric current output of the generator does not exceed the current limit.

13. A system for generating electricity from an exhaust gas flow from an internal combustion engine, comprising:

a turbine to be driven by the exhaust gas flow;
an electricity generator to be driven by the turbine;
a bypass path that enables exhaust gas flow from the engine to bypass the turbine; and
a control system configured to adjust the relative proportions of (a) exhaust gas flow through the turbine and (b) exhaust gas flow through the bypass path, in response to the speed of rotation of the turbine;
wherein the control system is configured to adjust the electric current output from the generator in response to the actual or predicted pressure of the exhaust gas at a position upstream of the turbine and the bypass path.

14. The system according to claim 13 which is arranged to adjust the electric current output by the generator in response to the speed of rotation of the turbine so as to seek to maintain the speed of rotation of the turbine at or below a first set speed, provided that the electric current output of the generator does not exceed a current limit.

15. The system according to claim 14 which is arranged to adjust the relative proportions of (a) exhaust gas flow through the turbine and (b) exhaust gas flow through the bypass path, in response to the speed of rotation of the turbine so as to seek to maintain the speed of rotation of the turbine at or below a second set speed, the second set speed being faster than the first set speed.

16. The system according to claim 14 which is arranged to adjust the electric current output by the generator in response to the speed of rotation of the turbine so as to seek to maintain the speed of rotation of the turbine at the first set speed, provided that the electric current output of the generator does not exceed the current limit.

17. A method of controlling a system for generating electricity from an exhaust gas flow from an internal combustion engine, wherein the system comprises: a turbine to be driven by the exhaust gas flow; and an electricity generator to be driven by the turbine;

wherein the method comprises:

adjusting an electric current output from the generator in response to a speed of rotation of the turbine, provided that the electric current output of the generator does not exceed a current limit; and reducing the electric current output from the generator, or reducing the said current limit, when an actual or predicted pressure of the exhaust gas at a position upstream of the turbine exceeds a pressure limit.

18. The method according to claim 17 in which the system further comprises a bypass path, downstream of the said position, that enables exhaust gas flow from the engine to bypass the turbine, and the method further comprises adjusting the relative proportions of (a) exhaust gas flow through the turbine and (b) exhaust gas flow through the bypass path, in response to the speed of rotation of the turbine, at least in the case that the electric current output of the generator reaches or exceeds the current limit.

19. The method according to claim 18 in which the electric current output from the generator is adjusted in response to the speed of rotation of the turbine, provided that the electric current output of the generator does not exceed a current limit, so as to seek to maintain the speed of rotation of the turbine at or below a first set speed, and at least in the case that the electric current output of the generator reaches or exceeds the current limit, the relative proportions of (a) exhaust gas flow through the turbine and (b) exhaust gas flow through the bypass path, are adjusted in response to the speed of rotation of the turbine so as to maintain the speed of rotation of the turbine at or below a second set speed, the second set speed being higher than the first set speed.

20. The method according to claim 19 in which the electric current output by the generator is adjusted in response to the speed of rotation of the turbine so as to seek to maintain the speed of rotation of the turbine at the first set speed, provided that the electric current output of the generator does not exceed the current limit.

21. A system for generating electricity from an exhaust gas flow from an internal combustion engine comprising:

a turbine to be driven by the exhaust gas flow;

an electricity generator to be driven by the turbine; and a control system configured to adjust an electric current output from the generator in response to a speed of rotation of the turbine, provided that the electric current output of the generator does not exceed a current limit;

wherein the control system is configured to reduce the electric current output from the generator, or reduce the said current limit, when an actual or predicted pressure of the exhaust gas at a position upstream of the turbine exceeds a pressure limit.

22. The system according to claim 21 which further comprises a bypass path, downstream of the said position, that enables exhaust gas flow from the engine to bypass the turbine, the system being arranged to adjust relative proportions of (a) exhaust gas flow through the turbine and (b) exhaust gas flow through the bypass path, in response to the speed of rotation of the turbine, at least in the case that the electric current output of the generator reaches or exceeds the current limit.

23. The system according to claim 22 which is arranged to adjust the electric current output from the generator in response to the speed of rotation of the turbine, provided that the electric current output of the generator does not exceed a current limit, so as to seek to maintain the speed of rotation of the turbine at or below a first set speed, and which is arranged to adjust relative proportions of (a) exhaust gas flow through the turbine and (b) exhaust gas flow through the bypass path, in response to the speed of rotation of the turbine so as to maintain the speed of rotation of the turbine at or below a second set speed, at least in the case that the electric current output of the generator reaches or exceeds the current limit, the second set speed being higher than the first set speed.

24. The system according to claim 23 which is arranged to adjust the electric current output by the generator in response to the speed of rotation of the turbine so as to seek to maintain the speed of rotation of the turbine at the first set speed, provided that the electric current output of the generator does not exceed the current limit.

* * * * *